US012587480B2

(12) United States Patent
Ma et al.

(10) Patent No.: US 12,587,480 B2
(45) Date of Patent: Mar. 24, 2026

(54) DELAY REPORTING FOR NETWORK SEGMENTS IN AN END-TO-END COMMUNICATION PATH

(71) Applicant: QUALCOMM Incorporated, San Diego, CA (US)

(72) Inventors: Liangping Ma, San Diego, CA (US); Nikolai Konrad Leung, San Francisco, CA (US); Prashanth Haridas Hande, San Diego, CA (US); Sebastian Speicher, Wallisellen (CH); Xiaolong Huang, Santee, CA (US); Srinivas Katar, Fremont, CA (US); Andrew MacKinnon Davidson, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 18/301,003

(22) Filed: Apr. 14, 2023

(65) Prior Publication Data

US 2024/0154908 A1 May 9, 2024

Related U.S. Application Data

(60) Provisional application No. 63/382,649, filed on Nov. 7, 2022.

(51) Int. Cl.
*H04L 47/10* (2022.01)
*H04L 43/0864* (2022.01)
(Continued)

(52) U.S. Cl.
CPC .......... *H04L 47/18* (2013.01); *H04L 43/0864* (2013.01); *H04L 47/2491* (2013.01); *H04W 28/0268* (2013.01)

(58) Field of Classification Search
CPC . H04L 47/18; H04L 43/0864; H04L 47/2491; H04L 43/0858; H04W 28/0268
See application file for complete search history.

(56) References Cited

U.S. PATENT DOCUMENTS

2015/0222549 A1* 8/2015 Kakadia ................ H04L 47/283
370/231
2017/0373950 A1* 12/2017 Szilagyi .............. H04L 47/2416
(Continued)

OTHER PUBLICATIONS

3GPP TR 26.806: "3rd Generation Partnership Project, Technical Specification Group SA, Study on Tethering AR Glasses—Architectures, QoS and Media Aspects (Release 18)", 3rd Generation Partnership Project, Mobile Competence Centre, 650, Route Des Lucioles, F-06921, Sophia-Antipolis Cedex, France, No. V0.3. 0, Sep. 23, 2022, pp. 1-28, XP052210991.
(Continued)

*Primary Examiner* — Mandish K Randhawa
(74) *Attorney, Agent, or Firm* — Dinsmore & Shohl LLP

(57) ABSTRACT

Embodiments of systems and methods for reporting a delay for network segments in an end-to-end communication path may include determining an end-to-end delay measurement of a communication path spanning a first communication network and a second communication network, and transmitting a message including delay information based on the determined end-to-end delay measurement to a network element of the first communication network, wherein the message is configured to enable the network element of the first communication network to configure the first communication network to provide sufficient Quality of Service (QoS) to support an end-to-end QoS requirement based on the delay information.

20 Claims, 24 Drawing Sheets

(51) Int. Cl.
 H04L 47/2491 (2022.01)
 H04W 28/02 (2009.01)

(56) References Cited

U.S. PATENT DOCUMENTS

| 2018/0077594 | A1 | 3/2018 | He et al. | |
| 2020/0037196 | A1* | 1/2020 | Iwai | H04W 28/16 |
| 2023/0132963 | A1* | 5/2023 | Ma | H04L 47/18 |
| | | | | 370/235 |
| 2023/0137968 | A1* | 5/2023 | Stockhammer | H04W 28/0268 |
| | | | | 370/235 |
| 2024/0113975 | A1* | 4/2024 | Ma | H04L 43/0864 |

OTHER PUBLICATIONS

"3rd Generation Partnership Project, Technical Specification Group Services and System Aspects, Study on Tethering AR Glasses—Architectures, QoS and Media Aspects (Release 18)", 3GPP TSG SA Plenary #100, SP-230537, 3rd Generation Partnership Project, Mobile Competence Centre, 650, Route Des Lucioles, F-06921 Sophia-Antipolis Cedex, France, Jun. 1, 2023, 52 Pages, XP052509698, 3GPP TR 26.806, V2.0.0, Clauses 6.1.2.1, 6.1.2.2, 6.2.1 to 6.2.3, 6.3.1, 6.3.2.

Brekalo A (Qualcomm Incorporated)., et al., "[FS_SmarTAR] Latency Aspects for SmarTAR", 3GPP SA4 MBS SWG, S4-221625, Type PCR, FS_Smartar, 3rd Generation Partnership Project, Mobile Competence Centre 650, Route Des Lucioles, F-06921 Sophia-Antipolis Cedex, France, vol. 3GPP SA 4, No. Toulouse, FR, Nov. 14, 2022-Nov. 18, 2022, Nov. 17, 2022, 8 Pages, XP052225849, the whole document.

International Search Report and Written Opinion—PCT/US2023/035778—ISA/EPO—Feb. 2, 2024. 18 pages.

Ma L (Qualcomm Incorporated)., et al., "[FS_SmarTAR] Latency Aspects for SmarTAR", 3GPP SA4 MBS SWG, S4A1221391, Type PCR, FS_Smartar, 3rd Generation Partnership Project, Mobile Competence Centre 650, Route Des Lucioles, F-06921 Sophia-Antipolis Cedex, France, vol. 3GPP SA 4, No. Online, Sep. 2, 2022 Nov. 4, 2022, Oct. 6, 2022, 4 Pages, XP052212014, the whole document.

* cited by examiner

150

160

170

171b        171a        171c

Non-SG        SG        Non-SG

Wireless Device    UE    175
174    Wi-Fi    172a
173

Application Client        gNB
172b

5GC
172c

UPF
172d

177

Application Server
176

180

181b        181a        181c

Non-SG        SG        Non-SG

Wireless Device    UE    185
184    Wi-Fi    182a
183

Application Client        gNB
182b

5GC
182c

UPF
182d

187

Internet
186

189

Application Server
188

200

| 266 | 206 | 208 |
|---|---|---|
| Wireless Transceiver | Clock | Voltage Regulator |

202

SOC #1

| 212 | 214 | 216 | 218 | 230 |
|---|---|---|---|---|
| Modem Processor | Graphics Processor | Applications Processor | Coprocessor | Temperature sensor(s) |

226

Interconnection/Bus

232

Thermal Management Unit

| 210 | 220 | 222 | 224 | 234 |
|---|---|---|---|---|
| Digital Signal Processor | Memory | Custom Circuitry | System Components and Resources | Thermal Power Envelope (TPE) Component |

204     250

SOC #2

| 252 | 254 |
|---|---|
| 5G Modem Processor | Power Management Unit |

264

Interconnection/Bus

| 256 | 258 | 260 |
|---|---|---|
| mmWave transceiver   mmWave transceiver | Memory | Additional Processor(s) |

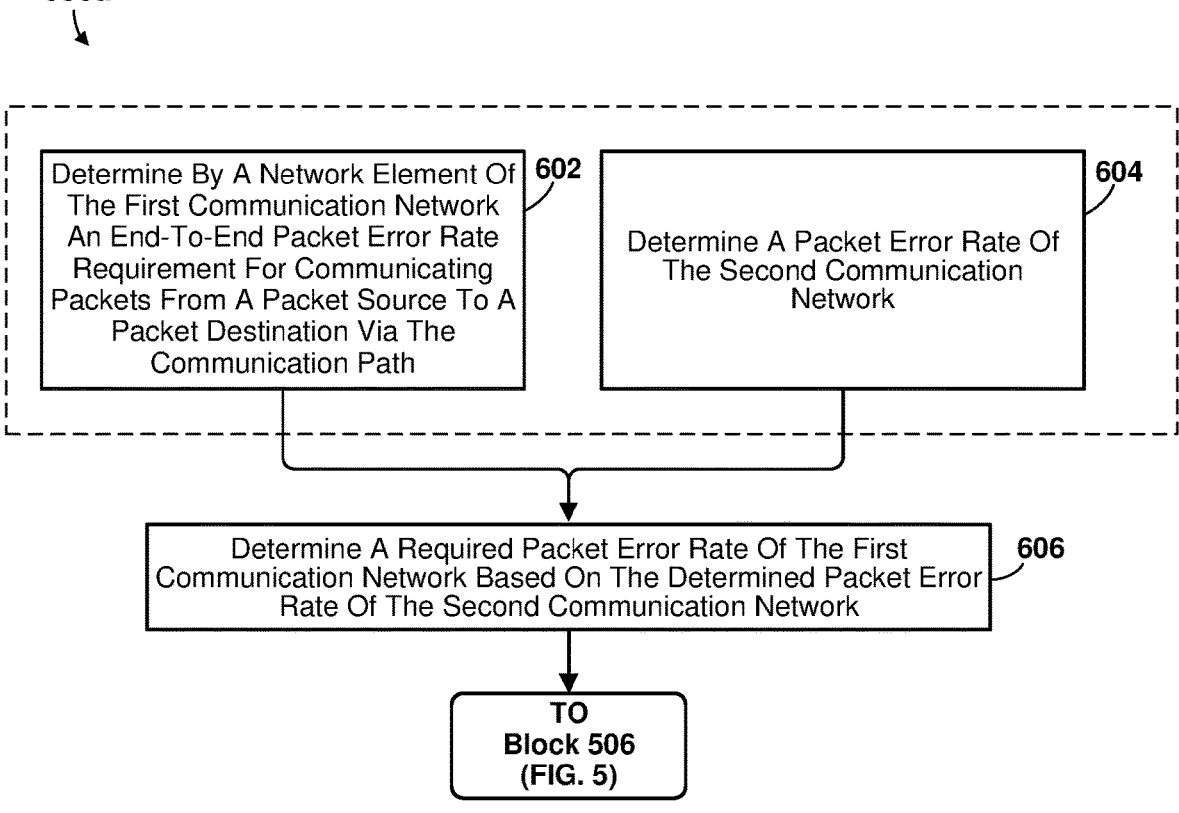

Determine By A Network Element Of The First Communication Network An End-To-End Packet Error Rate Requirement For Communicating Packets From A Packet Source To A Packet Destination Via The Communication Path — 602

Determine A Packet Error Rate Of The Second Communication Network — 604

Determine A Required Packet Error Rate Of The First Communication Network Based On The Determined Packet Error Rate Of The Second Communication Network — 606

TO
Block 506
(FIG. 5)

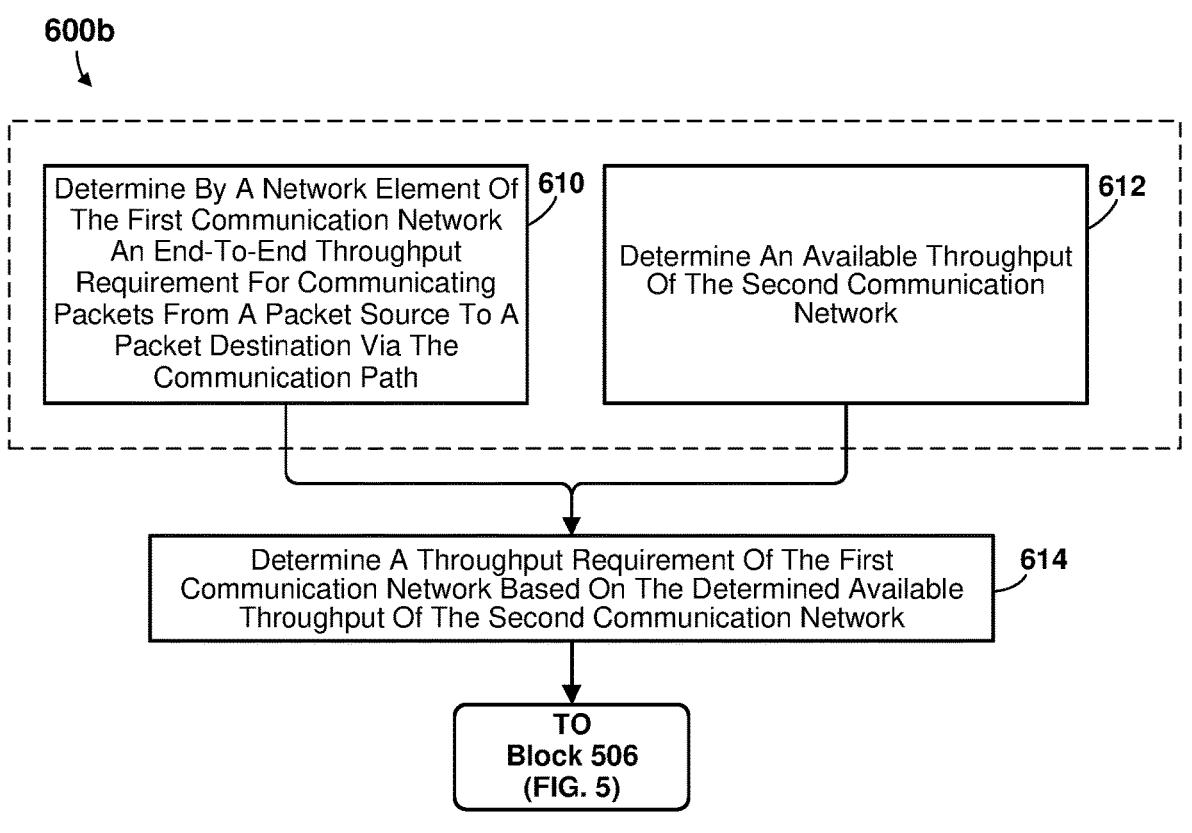

Determine By A Network Element Of The First Communication Network An End-To-End Throughput Requirement For Communicating Packets From A Packet Source To A Packet Destination Via The Communication Path     610

Determine An Available Throughput Of The Second Communication Network     612

Determine A Throughput Requirement Of The First Communication Network Based On The Determined Available Throughput Of The Second Communication Network     614

TO
Block 506
(FIG. 5)

FROM
Block 502
OR
Block 504
(FIG. 5)

Measure An End-To-End Achieved QoS    620

Identify A QoS Provided By The First Communication Network    622

Determine The QoS Provided By The Second Communication Network Within The Communication Path Based On The End-To-End Achieved QoS And The QoS Provided By The First Communication Network    624

TO
Block 506
(FIG. 5)

600d

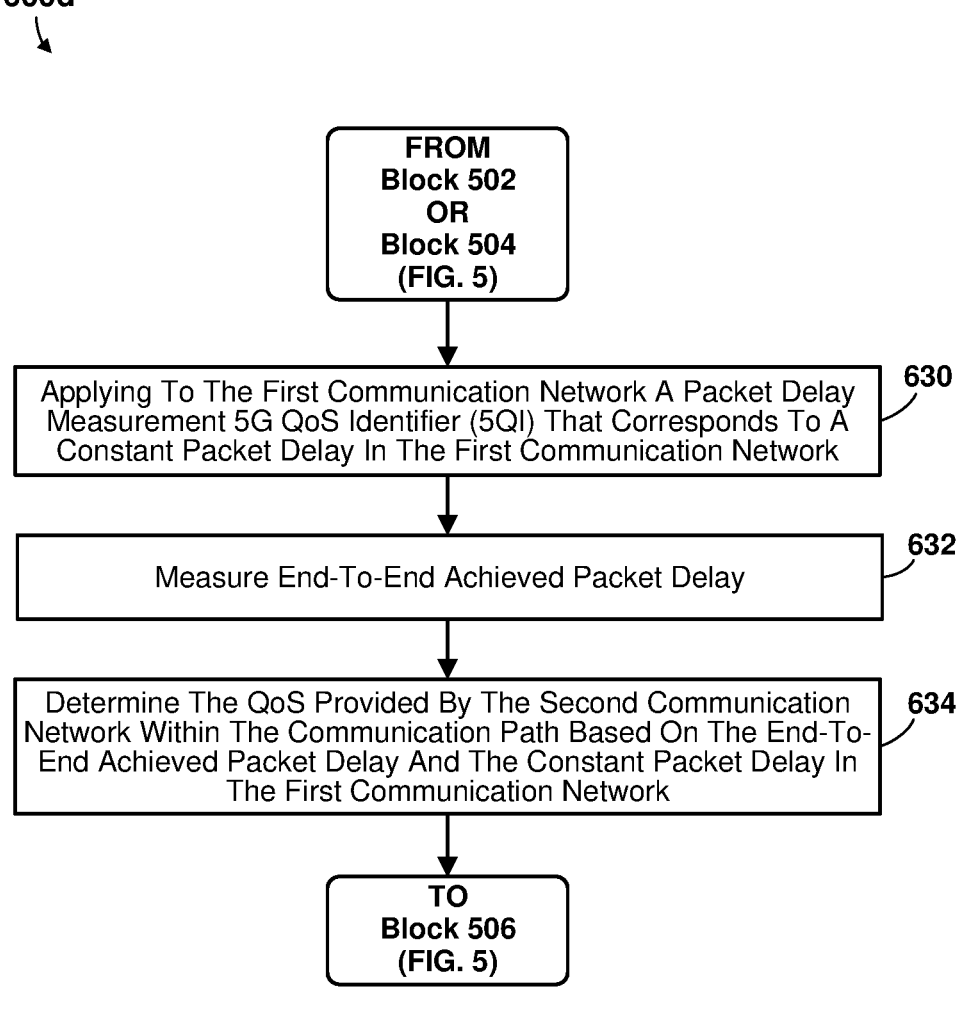

FROM
Block 502
OR
Block 504
(FIG. 5)

Applying To The First Communication Network A Packet Delay
Measurement 5G QoS Identifier (5QI) That Corresponds To A
Constant Packet Delay In The First Communication Network          630

Measure End-To-End Achieved Packet Delay          632

Determine The QoS Provided By The Second Communication
Network Within The Communication Path Based On The End-To-
End Achieved Packet Delay And The Constant Packet Delay In
The First Communication Network          634

TO
Block 506
(FIG. 5)

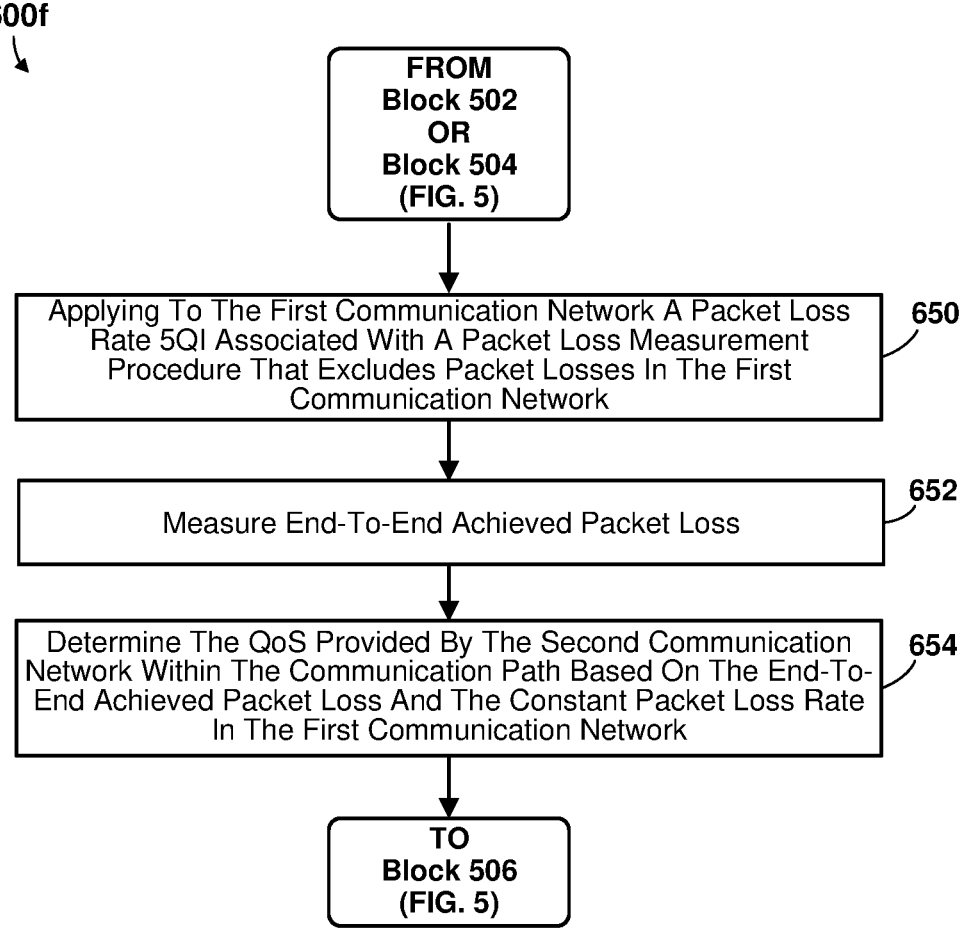

600f

FROM
Block 502
OR
Block 504
(FIG. 5)

Applying To The First Communication Network A Packet Loss
Rate 5QI Associated With A Packet Loss Measurement
Procedure That Excludes Packet Losses In The First
Communication Network     650

Measure End-To-End Achieved Packet Loss     652

Determine The QoS Provided By The Second Communication
Network Within The Communication Path Based On The End-To-
End Achieved Packet Loss And The Constant Packet Loss Rate
In The First Communication Network     654

TO
Block 506
(FIG. 5)

FIG. 6F

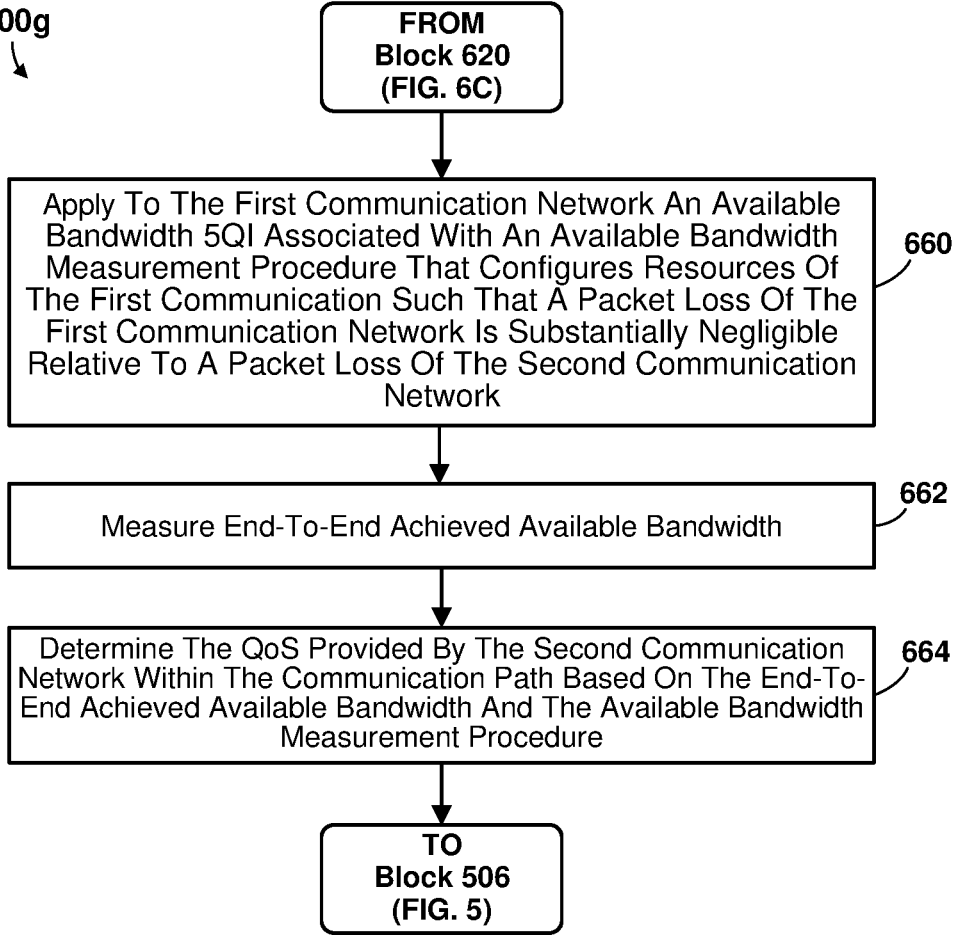

600g

FROM
Block 620
(FIG. 6C)

Apply To The First Communication Network An Available
Bandwidth 5QI Associated With An Available Bandwidth
Measurement Procedure That Configures Resources Of
The First Communication Such That A Packet Loss Of The
First Communication Network Is Substantially Negligible
Relative To A Packet Loss Of The Second Communication
Network     660

Measure End-To-End Achieved Available Bandwidth     662

Determine The QoS Provided By The Second Communication     664
Network Within The Communication Path Based On The End-To-
End Achieved Available Bandwidth And The Available Bandwidth
Measurement Procedure TO
Block 506
(FIG. 5)

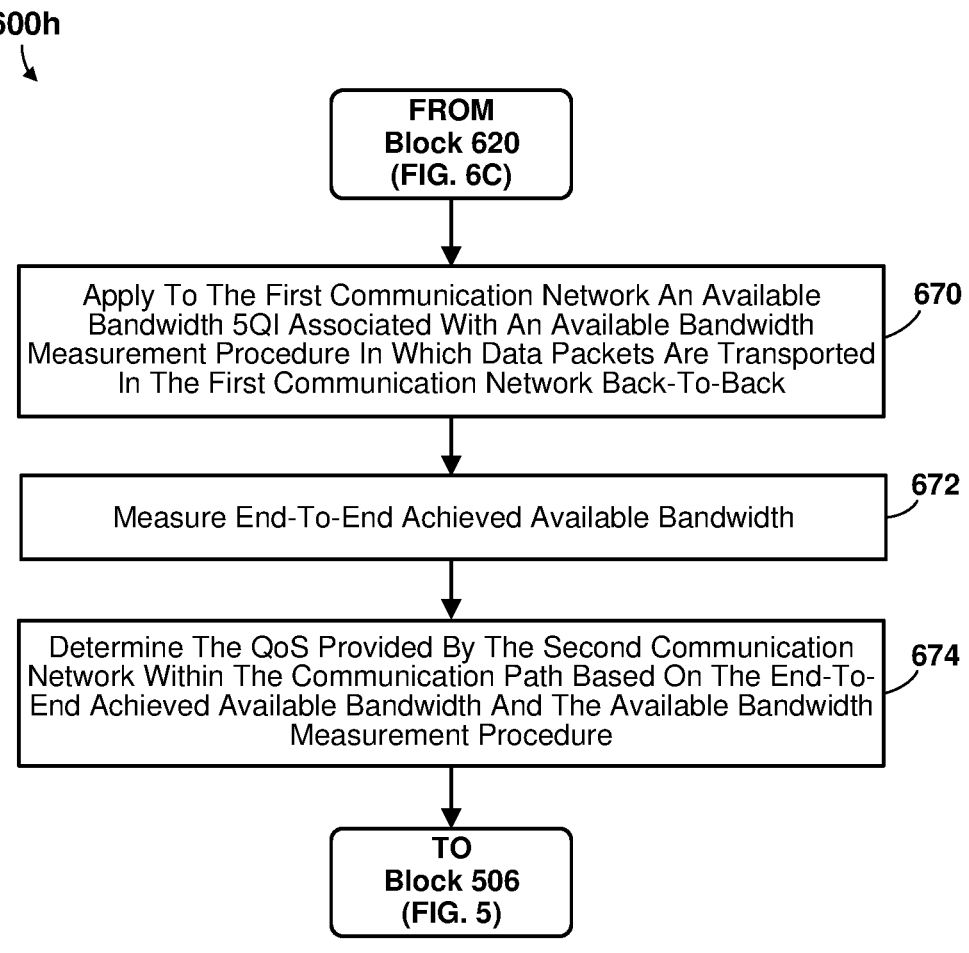

FROM
Block 620
(FIG. 6C)

Apply To The First Communication Network An Available Bandwidth 5QI Associated With An Available Bandwidth Measurement Procedure In Which Data Packets Are Transported In The First Communication Network Back-To-Back          670

Measure End-To-End Achieved Available Bandwidth          672

Determine The QoS Provided By The Second Communication Network Within The Communication Path Based On The End-To-End Achieved Available Bandwidth And The Available Bandwidth Measurement Procedure          674

TO
Block 506
(FIG. 5)

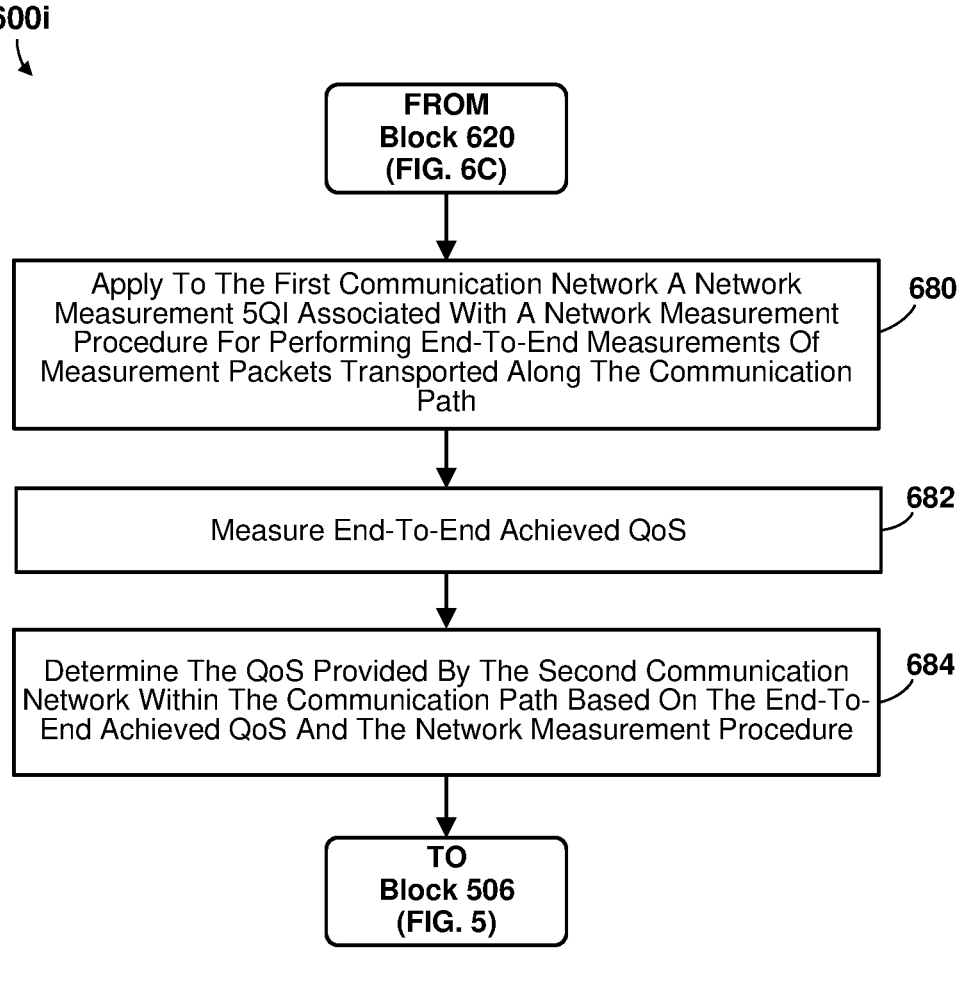

FROM
Block 620
(FIG. 6C)

Apply To The First Communication Network A Network
Measurement 5QI Associated With A Network Measurement
Procedure For Performing End-To-End Measurements Of
Measurement Packets Transported Along The Communication
Path                                                                                    680

Measure End-To-End Achieved QoS                                 682

Determine The QoS Provided By The Second Communication
Network Within The Communication Path Based On The End-To-
End Achieved QoS And The Network Measurement Procedure      684

TO
Block 506
(FIG. 5)

FIG. 6I $$p_n = \frac{N1 - N2 + (N3 - N4)}{N1 - (N2 - N3)}$$

$$p_n = \frac{N2 - N3}{N2}$$

700a

800

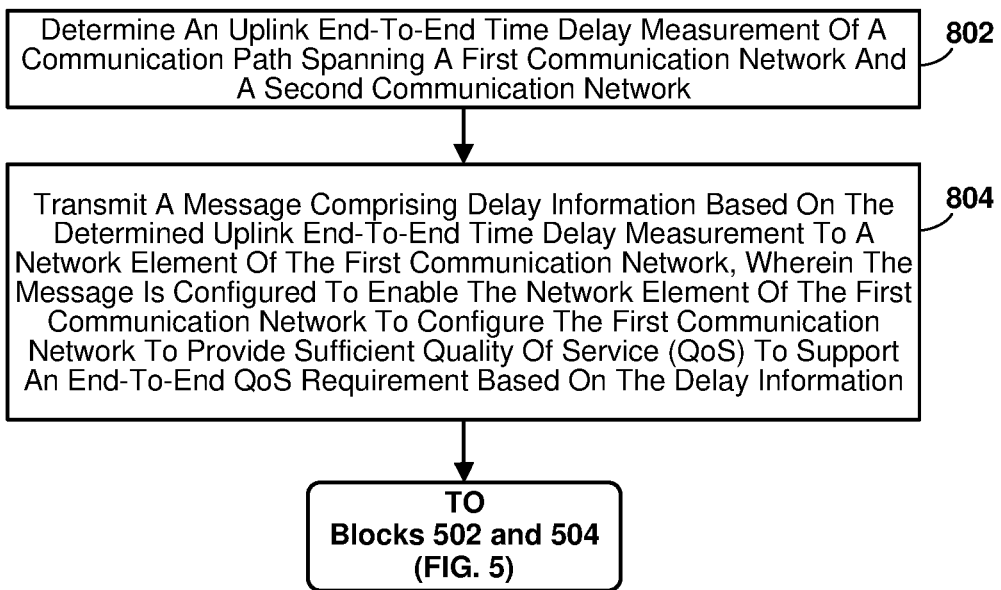

Determine An Uplink End-To-End Time Delay Measurement Of A Communication Path Spanning A First Communication Network And A Second Communication Network　　802

Transmit A Message Comprising Delay Information Based On The Determined Uplink End-To-End Time Delay Measurement To A Network Element Of The First Communication Network, Wherein The Message Is Configured To Enable The Network Element Of The First Communication Network To Configure The First Communication Network To Provide Sufficient Quality Of Service (QoS) To Support An End-To-End QoS Requirement Based On The Delay Information　　804

TO
Blocks 502 and 504
(FIG. 5)

FIG. 8

DELAY REPORTING FOR NETWORK SEGMENTS IN AN END-TO-END COMMUNICATION PATH

RELATED APPLICATIONS

This application claims the benefit of priority to U.S. Provisional Application No. 63/382,649 entitled "Delay Reporting For Network Segments In An End-To-End Communication Path" filed Nov. 7, 2022, the entire contents of which are hereby incorporated by reference for all purposes.

BACKGROUND

A communication network may be configured to provide a Quality of Service (QoS) for an application, service, or data flow. There is a resource cost in provisioning a network to provide a certain QoS, so to meet a particular QoS requirement network operators typically attempt to provide sufficient network resources without overcommitting or undercommitting network resources. Providing a QoS for an application, service, or data flow that involves communication across two or more networks of different types is even more complex.

SUMMARY

Various aspects include systems and methods performed by a computing device for reporting a delay for network segments in an end-to-end communication path spanning two communication networks. Various aspects may include methods and a computing device configured to perform the methods of determining an end-to-end delay measurement of a communication path spanning a first communication network and a second communication network, and transmitting a message including delay information based on the determined end-to-end delay measurement to a network element of the first communication network, wherein the message is configured to enable the network element of the first communication network to configure the first communication network to provide sufficient Quality of Service (QoS) to support an end-to-end QoS requirement based on the delay information. In various aspects, an end-to-end delay may include an uplink end-to-end delay, a downlink end-to-end delay, and/or a round-trip end-to-end delay. In some aspects, the first communication network may include a cellular network and the second communication network is not cellular network.

In some aspects, the delay information may include a requested delay budget for the first communication network. In some aspects, the delay information may include a requested delay budget for a network segment between a first computing device that is not at an end of the communication path and a second computing device that is at an end of the communication path. In some aspects, the delay information may include a requested delay budget for a network segment between a first endpoint computing device at a first end of the communication path and a second endpoint computing device at a second end of the communication path that is opposite from the first end of the communication path. In some aspects, the delay information may include one or more delay statistics based on the determined end-to-end delay measurement.

Further aspects include a computing device having a processor configured to perform one or more operations of any of the methods summarized above. Further aspects include a computing device configured with processor-executable instructions to perform operations of any of the methods summarized above. Further aspects include a non-transitory processor-readable storage medium having stored thereon processor-executable instructions configured to cause a processor of a computing device to perform operations of any of the methods summarized above. Further aspects include a computing device having means for performing functions of any of the methods summarized above. Further aspects include a system on chip for use in a computing device and that includes a processor configured to perform one or more operations of any of the methods summarized above.

BRIEF DESCRIPTION OF THE DRAWINGS

FIG. 2 is a component block diagram illustrating an example computing and wireless modem system suitable for implementing any of the various embodiments.

FIGS. 6A-6I are process flow diagrams illustrating operations that may be performed by a processor of a network element as part of the method for managing end-to-end QoS in a communication path spanning a first communication network and a second communication network according to various embodiments.

FIG. 8 is a process flow diagram illustrating a method that may be performed by a processor of a computing device for reporting a delay for network segments in an end-to-end communication path according to some embodiments.

DETAILED DESCRIPTION

Figure 1A:
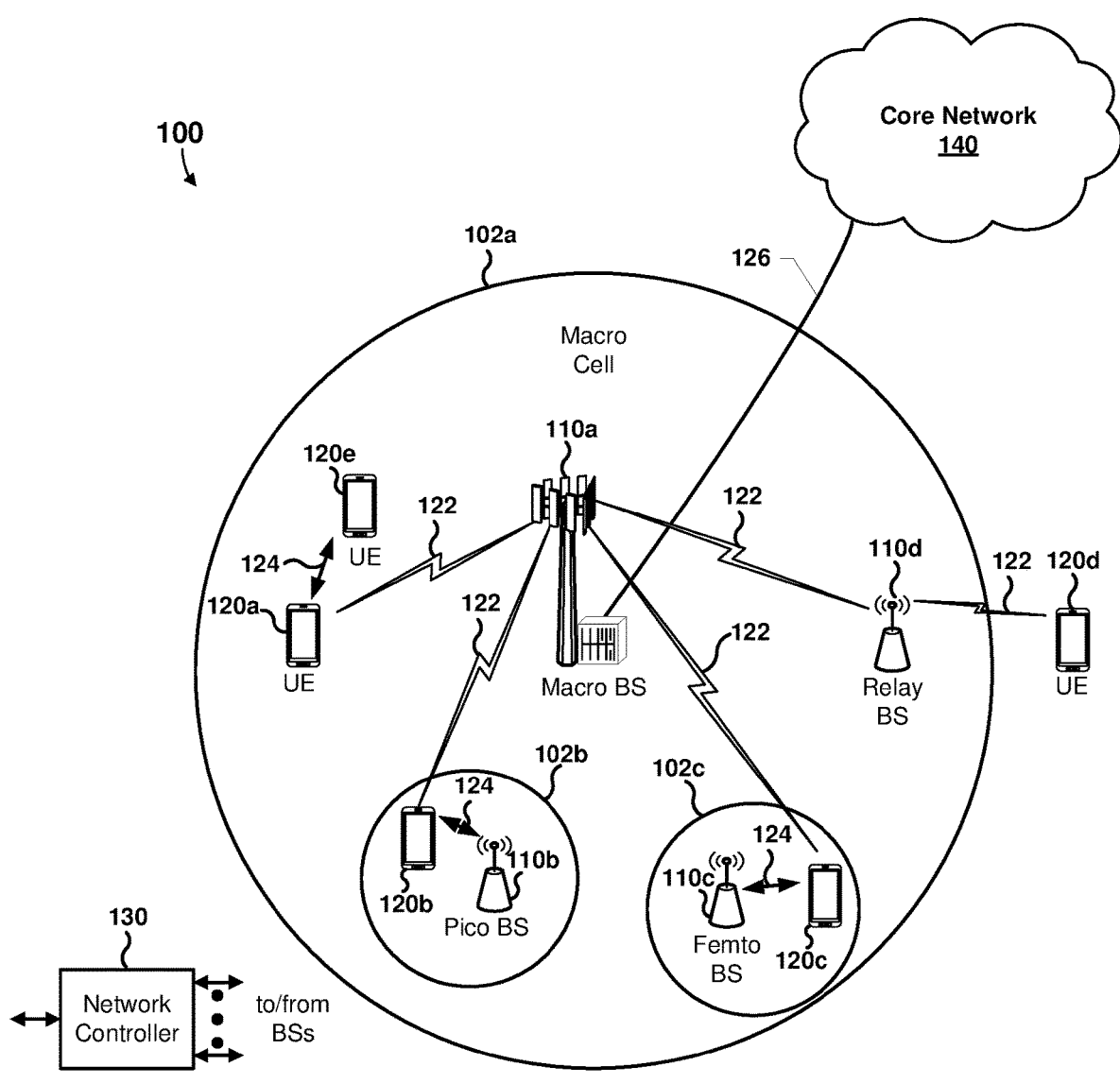
FIG. 1A is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for reporting a delay for network segments in an end-to-end communication path spanning a first communication network and a second communication network. Various embodiments may enable a network element to determine QoS requirements for a first communication network based on the end-to-end QoS requirements and the achieved QoS of a second communication network, such as a communication path that traverses a cellular network and one or more non-cellular networks. Various embodiments may enable a network element to determine the achieved QoS of the second communication network(s) (e.g., the one or more non-cellular networks). Various embodiments may enable a computing device to determine an end-to-end delay measurement of a communication path spanning a first communication network and a second communication network, and transmit a message that includes delay information based on the determined end-to-end delay measurement to a network element of the first communication network, wherein the message is configured to enable the network element of the first communication network to configure the first communication network to provide sufficient QoS to support an end-to-end QoS requirement based on the delay information.

Various embodiments and examples described herein may refer to specific cellular networks and specific non-cellular networks for clarity. For example, references to 5G networks or 5G devices, or non-5G networks or non-5G devices, are not intended as limitations to 5G systems, devices, networks, or protocols. Rather, references to 5G and non-5G networks and devices are examples of cellular or non-cellular systems, devices, networks, or protocols.

The term "network element" is used herein to refer to any one or all of a computing device that is part of or in communication with a communication network, such as a server, a router, a gateway, a hub device, a switch device, a bridge device, a repeater device, or another electronic device that includes a memory, communication components, and a programmable processor. A wireless device in communication with a network may be considered a network element of such network.

As used herein, the terms "network," "communication network," and "system" may interchangeably refer to a portion or all of a communications network or internetwork. A network may include a plurality of network elements. A network may include a wireless network, and/or may support one or more functions or services of a wireless network.

As used herein, "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

Providing a QoS for an application, service, or data flow that involves communication across two or more networks of different types is complex. A communication network may be able to determine information about, and configure the operations of, its own network elements, including devices communicating with or to those network elements (e.g., devices connected to the communication network). However, a communication network may be unable to obtain information about the operations of other communication networks. For example, an application client of a wireless device may communicate over a communication path with another device (e.g., an application server, or another wireless device). The communication path between the two endpoint devices (the "end-to-end" communication path) may span multiple networks.

As an example, to provide augmented reality application, wireless smart glasses may communicate with (send signals to and receive signals from) an application server over a communication path that spans multiple communication networks. For instance, the smart glasses may communicate with a smart phone over a Wi-Fi network; the smart phone may communicate with a 5G network base station over a cellular communication link; the 5G network may communicate with an internetwork (e.g., the internet); and the internetwork may communicate with a wired network using Ethernet that includes the application server. In this example, the communication path between the smart glasses and the application server spans a Wi-Fi network, a 5G network, an internetwork, and a wired Ethernet network. The augmented reality application of the smart glasses may require a particular QoS to meet one or more application requirements. One network, e.g., the 5G network, may be able to configure its various network elements according to the QoS requirement of the application. However, the 5G network typically has no control over the configuration or operations of network elements of the Wi-Fi network, the internetwork, or the wired Ethernet network.

Various embodiments include methods and network devices configured to perform the methods of reporting delay information for one or more network segments in an end-to-end communication path spanning a first communication network and a second communication network (which may include one or more other communication networks). For example, the first communication network may include a cellular communication network configured according to 3rd Generation Partnership Project (3GPP) standards, such as a 5G network, a 6G network, and the second communication network may not be a cellular network, for example, a Wi-Fi network, a Bluetooth network, or another suitable network. Various operations may be performed by a computing device that communicates with a network element of a communication network. In some embodiments, a network element of the first communication network may configure the first communication network to provide sufficient Quality of Service (QoS) to support the end-to-end QoS requirement.

In some embodiments, the computing device may determine an end-to-end delay measurement of a communication path spanning a first communication network and a second communication network. The computing device may transmit a message (e.g., a report) that includes delay information based on the determined end-to-end delay measurement to a network element of the first communication network. In some embodiments, the message may be configured to enable the network element of the first communication network to configure the first communication network to provide sufficient QoS to support an end-to-end QoS requirement based on the delay information.

In some embodiments, the computing device may configure the message such that the delay information includes a requested delay budget for the first communication network. In some embodiments, the requested delay budget may be associated with a traffic flow communicated in the communication path spanning the first communication network and the second communication network. For example, the requested delay budget may be associated with a traffic flow of an application that is executing on an endpoint device. For example, a computing device at one end of the end-to-end communication path and an application server at an opposite end of the end-to-end communication path may transmit and/or receive information used by an application executing in the computing device. As another example, the application may be executing on an endpoint device (e.g., smart glasses) that communicates with a computing device (e.g., a smartphone) that is configured to communicate with the first communication network (e.g., a cellular communication-enabled computing device).

In some embodiments, the delay information may include a requested delay budget for a network segment (i.e., a portion of the communication path) between a first computing device that is not at an end of the communication path and a second computing device that is at an end of the communication path. As one example, the delay information may include a requested delay budget for a network segment between an application server that is at an end of the communication path, and a network element in a communication network (or a function executing in a network element, such as a Media Access Function), which is not at an end of the communication path, but rather is an intermediate network element along the communication path.

In some embodiments, the computing device may configure the message such that the delay information includes a requested delay budget for a network segment between a first computing device and a second computing device that are at the same end of the communication path. The delay budget may depend on the types of operations or uses of data that are performed by a particular application executing on the computing device, such as an augmented reality (AR) application. For example, the delay information may include a requested delay budget for network segment between smart glasses (or another suitable computing device) rendering AR media and a cellular communication-enabled computing device (e.g., a cellular phone or laptop). In some embodiments, the computing device may configure the message such that the delay information includes a requested delay budget for a network segment between a first endpoint computing device at a first end of the communication path and a second endpoint computing device at a second end of the communication path that is opposite from the first end of the communication path. For example, the delay information may include a requested delay budget for a network segment between a reporting device (e.g., a UE, or computing device in communication with the UE) and another endpoint computing device (e.g., second UE, or an application server). In some embodiments, a network element of the first communication network may determine or infer a delay budget for the first communication network by, for example, subtracting a delay time between a user plane function of the first communication network and an application server (or another suitable endpoint computing device).

In some embodiments, the computing device may configure the message such that the delay information includes one or more delay statistics based on the determined end-to-end delay measurement. In various embodiments, the delay statistics may represent or be based on measurements of delay over one or more non-cellular networks (i.e., the second communication network). In some embodiments, the delay statistics may include a mean of one or more delay measurements, a standard deviation of one or more delay measurements, a distribution of one or more delay measurements (such as a quantized cumulative distribution function (CDF)), bins (e.g., resulted from partitioning a range of measurements) with probabilities of one or more delay measurements, and/or percentile (e.g., 95th percentile) of one or more delay measurements.

In some embodiments, the message transmitted by the computing device may include an indication of a type of content or information included in the message (e.g., one or more delay values and/or one or more delay statistics). In some embodiments, any appropriately configured computing device may generate and/or transmit the message, such as a UE, or a computing device in communication with the UE, provided that such computing device is executing an appropriately configured cellular protocol stack that enables the computing device to communicate the message to the first communication network. In some embodiments, the computing device may execute a Media Access Function or a Media Session Handler that is configured to generate and/or transmit the message to the first medication network.

Various embodiments may improve the operation of a communication network by enabling the configuration of network elements to provide an QoS that meets a QoS requirement for a device, application, or service. Various embodiments may improve the operation of a first communication network by enabling the determination of a QoS provided by another communication network that may include network elements that are not under the control of, or may not otherwise provide information to, the first communication network.

FIG. 1A is a system block diagram illustrating an example communications system 100 suitable for implementing any of the various embodiments. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as user equipment (UE) 120a-120e in FIG. 1). The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices 120a-120e (for example, illustrated as the wireless device 120a and the wireless device 120e) may communicate directly using one or more sidelink channels 124 (for example, without using a base station 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 1B:
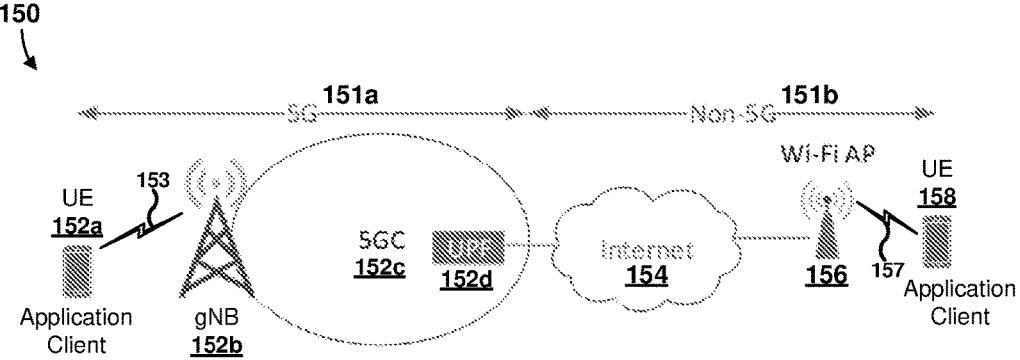
FIGS. 1B-1E are system block diagrams illustrating example communications systems suitable for implementing any of the various embodiments.
Figure 1C:
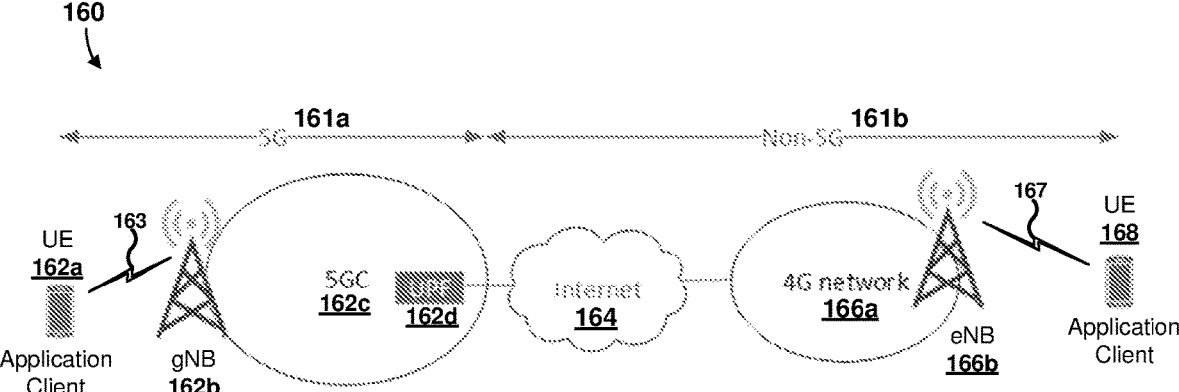
Figure 1D:
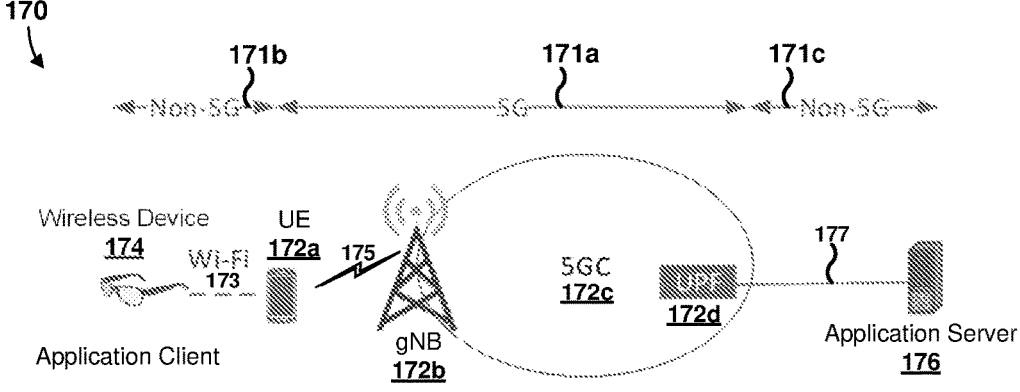

FIGS. 1B-1D are system block diagrams illustrating example communications systems 150, 160, 170, and 180 suitable for implementing any of the various embodiments. With reference to FIGS. 1A-1D, the communications systems 150, 160, 170, and 180 illustrate examples end-to-end communication paths between two endpoint devices that span multiple communication networks. It will be understood that the examples illustrated in communications systems 150, 160, 170, and 180 are non-limiting, and that other implementations of end-to-end communication paths between two endpoint devices that span multiple communication networks are also possible.

Referring to FIG. 1B, an application client executing on a UE 152a (e.g., the wireless devices 120a-120e) may communicate with an application client executing on a UE 158 (e.g., the wireless devices 120a-120e). The communication path between the UE 152a and the UE 158 may span two networks, for example, a 5G network 151a and a non-5G network 151b. In some embodiments, the 5G network 151a may include the UE 152a that may communicate with a gNB 152b via a cellular communication link 153, a 5G core network 152c, and a user plane function (UPF) 152d that may enable communication between the 5G network 151a and the non-5G network 151b.

The non-5G network 151b may include an internetwork such as the internet 154, a Wi-Fi access point (AP) 156, and the wireless device 158, which may communicate with the Wi-Fi access point 156 via a Wi-Fi wireless communication link 157.

Referring to FIG. 1C, an application client executing on a UE 162a (e.g., the wireless devices 120a-120e) may communicate with an application client executing on a UE 168 (e.g., the wireless devices 120a-120e). The communication path between the UE 162a and the UE 168 may span two networks, for example, a 5G network 161a and a non-5G network 161b. In some embodiments, the 5G network 161a may include the UE 162a that may communicate with a gNB 152b via a cellular communication link 163, a 5G core network 162c, and a user plane function 162d that may enable communication between the 5G network 161a and the non-5G network 161b. The non-5G network 161b may include an internetwork such as the internet 164, a 4G network 166a, a 4G base station such as an eNB 166b, and a wireless device 168, which may communicate with the eNB 166b via a 4G wireless communication link 167.

Referring to FIG. 1D, the communication system 170 may include three networks. An application client executing on a wireless device 174 (illustrated as smart glasses) in a first non-5G network 171b may communicate with an application server 176 in a second non-5G network 171c via a 5G network 171a. In this manner, the communication path between the wireless device 174 and the application server 176 may span three communication networks. In some embodiments, the first non-5G network 171b may include the wireless device 174, which may communicate with a wireless device (UE) 172a via a Wi-Fi communication link 173. The 5G network 171a may include the UE 172a that may communicate with a gNB 172b via a cellular communication link 175, a 5G core network 172c, and a user plane function 172d that may enable communication between the 5G network 171a and the second non-5G network 171c. The second non-5G network 171c may include the application server 176, which may communicate with the 5G network via a wired communication link 177.

Figure 1E:
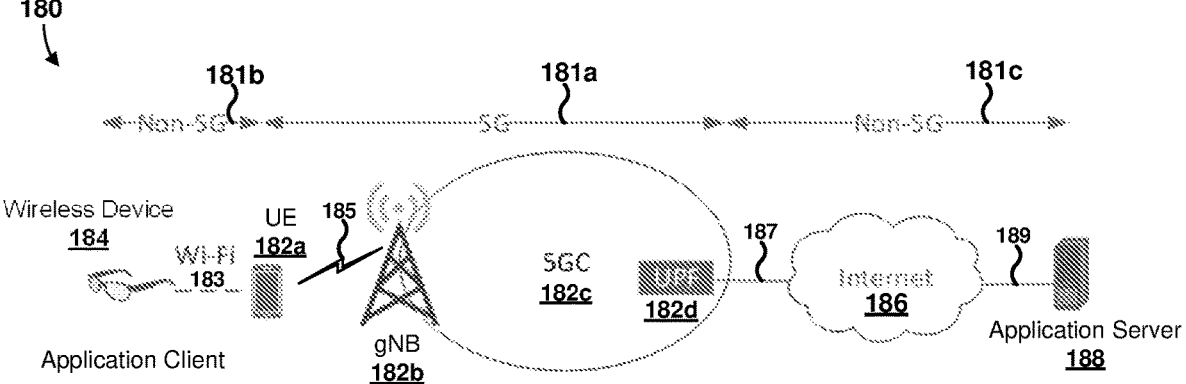

Referring to FIG. 1E, the communication system 180 may include three networks. An application client executing on a wireless device 184 (illustrated as smart glasses) in a first non-5G network 181b may communicate with an application server 188 in a second non-5G network 181c via a 5G network 181a. In this manner, the communication path 189 between the wireless device 184 and the application server 188 may span three communication networks. In some embodiments, the first non-5G network 181b may include the wireless device 184, which may communicate with a wireless device (UE) 182a via a Wi-Fi communication link 181b. The 5G network 181a may include the UE 182a that may communicate with a gNB 182b via a cellular communication link 183, a 5G core network 182c, and a user plane function 182d that may enable communication between the 5G network 181a and the second non-5G network 181c. The second non-5G network 181c may include an internetwork (such as the internet) 186 that may communicate with the 5G network via a wired communication link 185, and the application server 188, which may communicate with the internetwork 186 via a wired communication link 187.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing device 200 (which may be a SIP in some embodiments) includes two SOCs 202, 204 coupled to a clock 206, a voltage regulator 208, and a wireless transceiver 266 configured to send and receive wireless communications via an antenna (not shown) to/from a wireless device (e.g., 120a-120e) or a base station (e.g., 110a-110d). In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), and/or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/ cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/ bus module 226, 250, 264 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
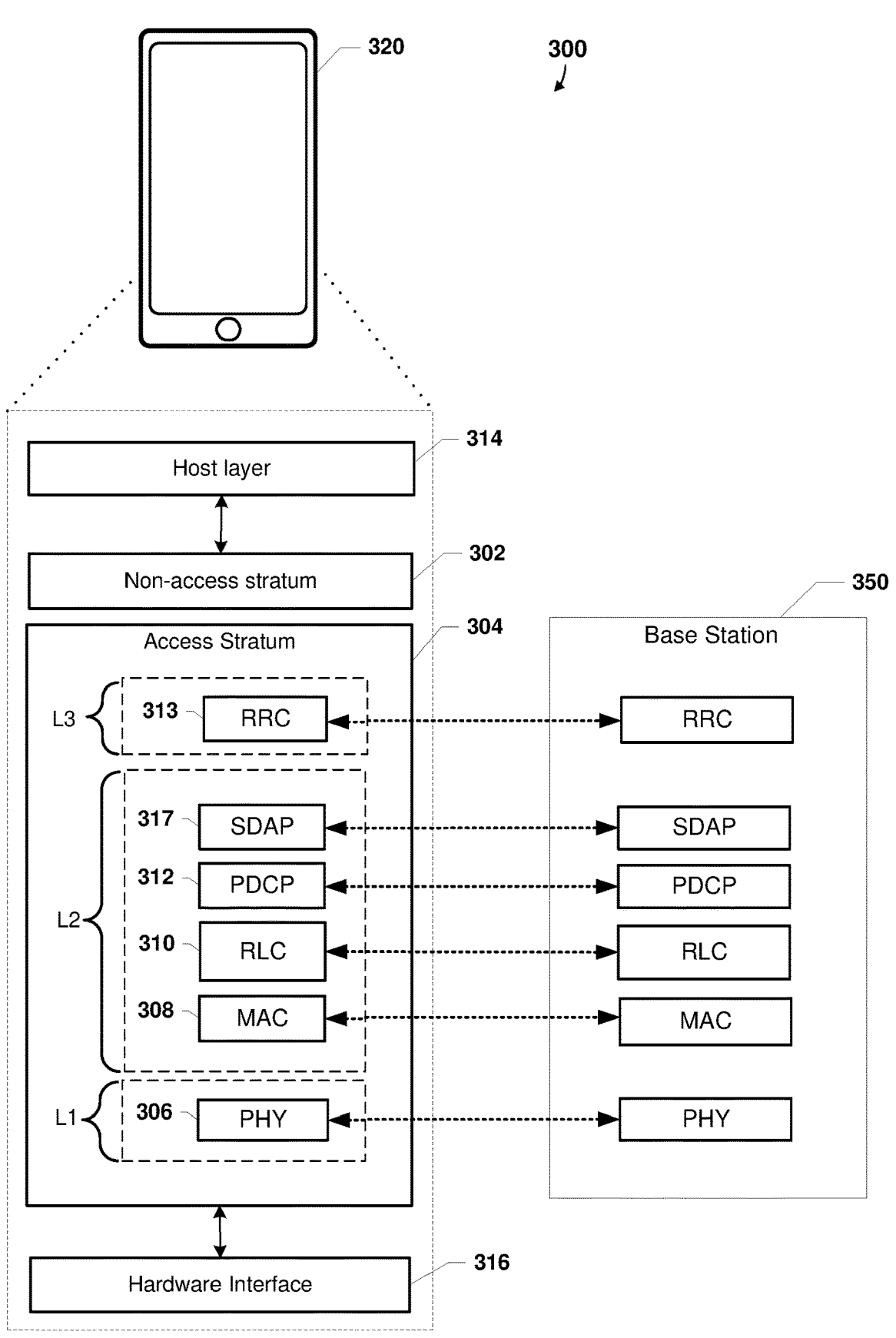
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252,

260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet Protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
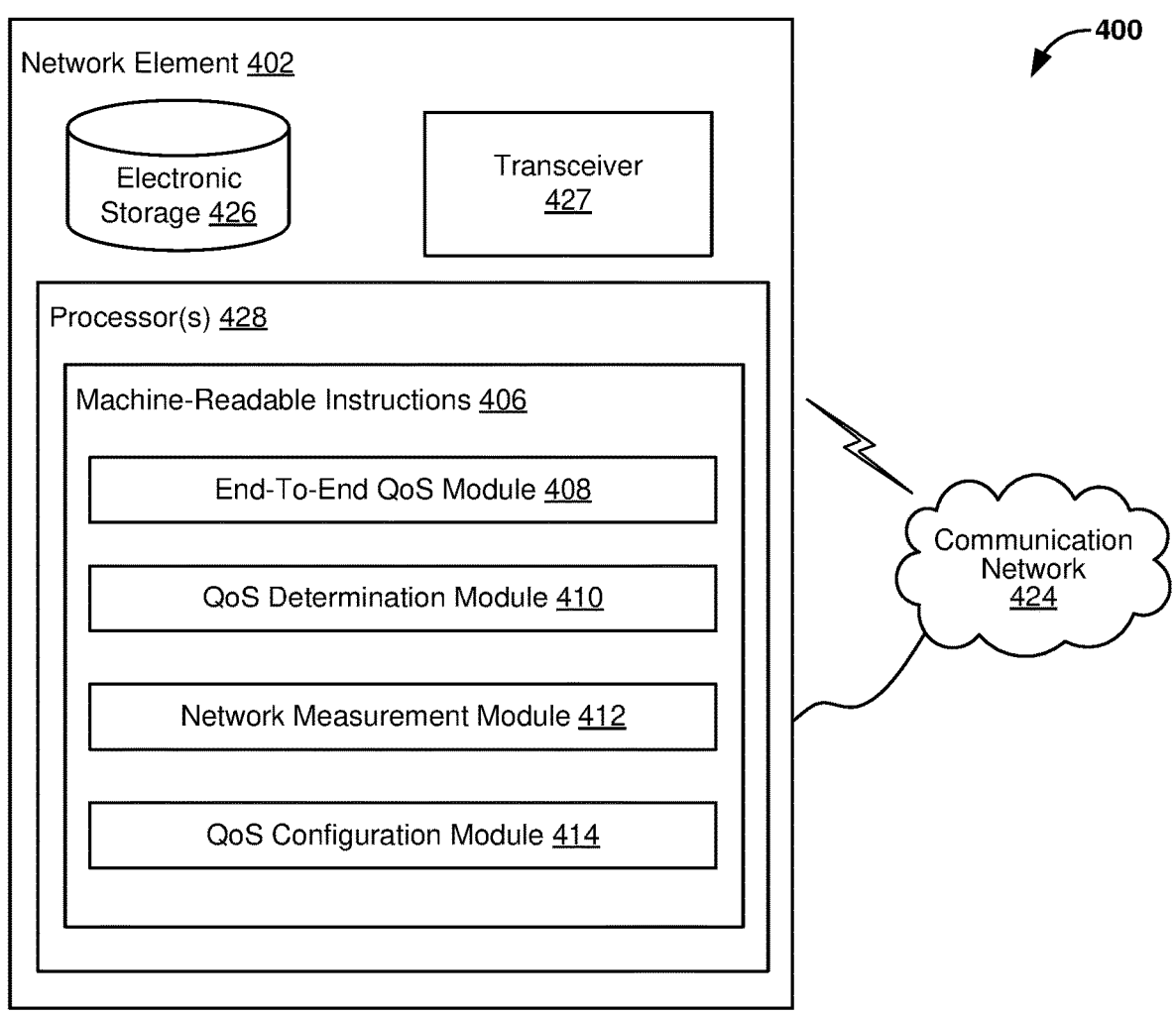
FIG. 4 is a component block diagram illustrating a system configured for managing end-to-end QoS in a communication path spanning a first communication network and a second communication network in accordance with various embodiments.

FIG. 4 is a component block diagram illustrating a system 400 configured for managing end-to-end QoS in a communication path spanning a first communication network and a second communication network in accordance with various embodiments. With reference to FIGS. 1-4, system 400 may include a network element 402 of a 5G network, such as a wireless device (e.g., 110a-110d, 200, 320), a base station (e.g., 120a-120e, 200, 350), or another network element of a 5G network, including any network element of the core network 140 or the 5G networks 151a, 161a, 171a, and 181a.

The network element 402 may be a computing device (e.g., a server or similar computer) including one or more processors 428 coupled to electronic storage 426 and a transceiver 427 (which may be a wired transceiver and/or a wireless transceiver, e.g., 266). In the network element 402, the transceiver 427 may be configured to receive messages sent in transmissions and pass such message to the processor (s) 428 for processing. Similarly, the processor 428 may be configured to send messages for transmission to the transceiver 427 for transmission. The network element 402 may send or receive messages to or from a communication network 424 via a wired and/or wireless communication link.

Referring to the base station 402, the processor(s) 428 may be configured by machine-readable instructions 406. Machine-readable instructions 406 may include one or more instruction modules. The instruction modules may include computer program modules. The instruction modules may include one or more of an end-to-end QoS module 408, a QoS determination module 410, a network measurement module 412, a QoS configuration module 414, or other instruction modules.

The end-to-end QoS module 408 may be configured to determine an end-to-end QoS requirement for communicating packets from a packet source to a packet destination by the communication path.

The QoS determination module 410 may be configured to determine a QoS provided by the second communication network within the communication path. The QoS determination module 410 may be configured to determine a packet error rate of the second communication network. The QoS determination module 410 may be configured to determine an available throughput of the second communication network. The QoS determination module 410 may be configured to measure an end-to-end achieved QoS, identify a QoS provided by the first communication network, and determine the QoS provided by the second communication network within the communication path based on the end-to-end achieved QoS and the QoS provided by the first communication network.

The network measurement module 412 may be configured to apply to the first communication network a packet delay measurement 5QI that corresponds to a constant packet delay in the first communication network, and determine the QoS provided by the second communication network within the communication path based on the end-to-end achieved QoS and the constant packet delay in the first communication network. In some embodiments, the network measurement module 412 may be configured to apply to the first communication network a packet loss rate 5QI that corresponds to a constant packet loss rate in the first communication network, and determine the QoS provided by the second communication network within the communication path based on the end-to-end achieved QoS and the constant packet loss rate in the first communication network. In some embodiments, the network measurement module 412 may be configured to apply to the first communication network a packet loss rate 5QI associated with a packet loss measurement procedure that excludes packet losses in the first communication network, and determine the QoS provided by the second communication network within the communication path based on the end-to-end achieved QoS and the packet loss measurement procedure.

In some embodiments, the network measurement module 412 may be configured to apply to the first communication network an available bandwidth 5QI associated with an available bandwidth measurement procedure that configures resources of the first communication network such that a packet loss of the first communication network is substantially negligible relative to a packet loss of the second communication network, and determine the QoS provided by the second communication network within the communication path based on the end-to-end achieved QoS and the available bandwidth measurement procedure. In some embodiments, the network measurement module 412 may be configured to apply to the first communication network an available bandwidth 5QI associated with an available bandwidth measurement procedure in which data packets are transported in the first communication network back-to-back, and determine the QoS provided by the second communication network within the communication path based on the end-to-end achieved QoS and the available bandwidth measurement procedure. In some embodiments, the network measurement module 412 may be configured to apply to the first communication network a network measurement 5QI associated with a network measurement procedure for performing end-to-end measurements of measurement packets transported along the communication path, and determine the QoS provided by the second communication network within the communication path based on the end-to-end achieved QoS and the network measurement procedure. In some aspects, the measurements packets may be test packets, probe packets, or packets of the application between the two end-point devices.

The QoS configuration module 414 may be configured to configure the first communication network to provide sufficient QoS to support the end-to-end QoS requirement based on the QoS provided by the second communication network. The QoS configuration module 414 may be configured to determine a required packet error rate of the first communication network based on the determined packet error rate of the second communication network. QoS configuration module 414 may be configured to determine a throughput requirement of the first communication network based on the determined available throughput of the second communication network.

The electronic storage 426 may include non-transitory storage media that electronically stores information. The electronic storage media of electronic storage 426 may include one or both of system storage that is provided integrally (i.e., substantially non-removable) with the network element 402 and/or removable storage that is removably connectable to the network element 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from the network element 402, or other information that enables the network element 402 to function as described herein.

Processor(s) 428 may be configured to provide information processing capabilities in the network element 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 are illustrated as single entities, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408-414 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 described below is for illustrative purposes, and is not intended to be limiting, as any of modules 408-414 may provide more or less functionality than is described. For example, one or more of the modules 408-414 may be eliminated, and some or all of its functionality may be provided by other modules 408-414. As another example, the processor(s) 428 may be configured to execute one or more additional modules that may perform some or all of the functionality attributed below to one of the modules 408-414.

Figure 5:
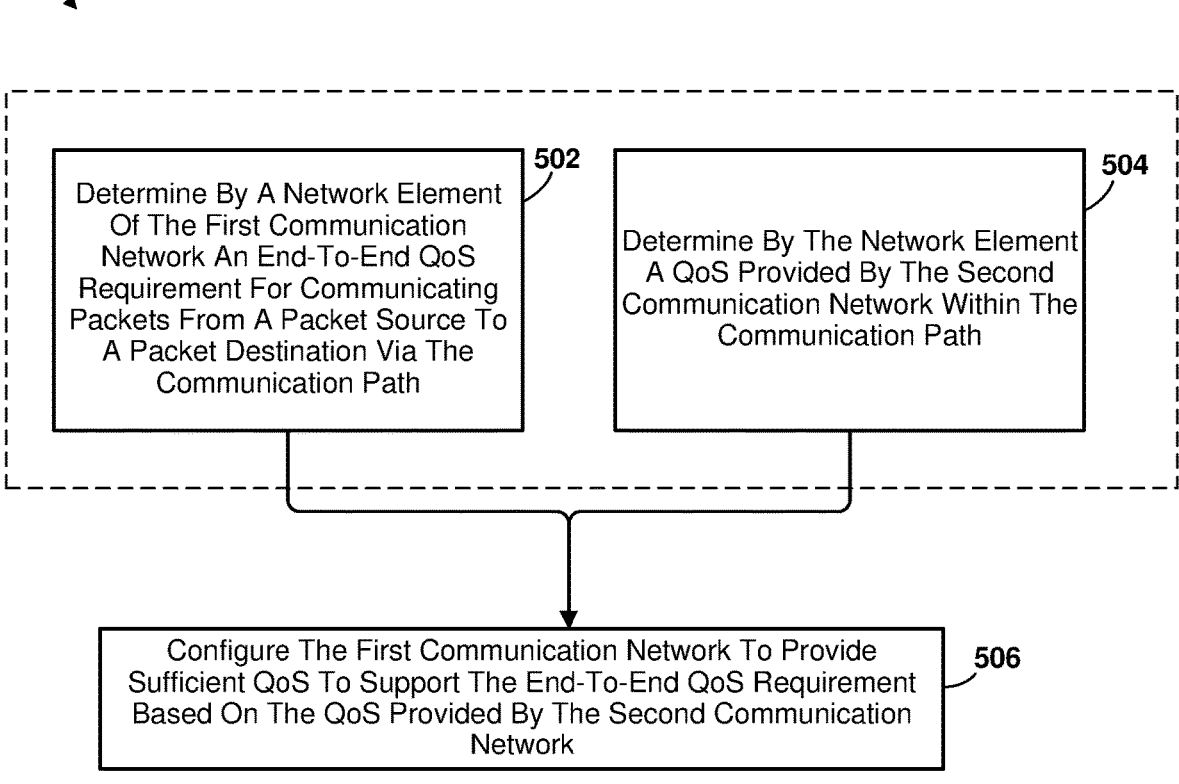
FIG. 5 is a process flow diagram illustrating a method performed by a processor of a network element for managing end-to-end QoS in a communication path according to various embodiments.

FIG. 5 is a process flow diagram illustrating a method 500 performed by a processor of a computing device functioning as a network element for enhancing coverage for initial access according to various embodiments. With reference to FIGS. 1-5, the operations of the method 500 may be performed by a processor (such as the processor 210, 212, 214, 216, 218, 252, 260, 428) of a computing device configured to function as a network element (e.g., 402) of the core network 140 or the 5G networks 151a, 161a, 171a, and 181a, a base station device (such as the base station 110a-110d, 200, 350, or a wireless device (e.g., 110a-110d, 200, 320)

In various embodiments, the processor may perform the operations of blocks 502 and 504 in any order, or substantially simultaneously (indicated by the dashed box).

In block 502, the processor may determine an end-to-end QoS requirement for communicating packets from a packet source to a packet destination via the communication path. In some embodiments, the communication path may span two or more communication networks, such as a first communication network and a second communication network. In some embodiments, the first communication network may include a 5G network and the second communication network may include a non-5G network. In some embodiments, the processor may determine an end-to-end QoS requirement associated with an application or application client executing on an endpoint device (e.g., 152a, 162a, 172a, 182a). In some embodiments, the processor may receive the message from an application or application client including the end-to-end QoS requirement. In some embodiments, the processor may determine the end-to-end QoS requirement based on one or more messages from the application, application client, and/or endpoint device. Means for performing the operations of block 502 may include the processor 210, 212, 214, 216, 218, 252, 260, 428 of a computing device functioning as a network element, the wireless transceiver 266, the transceiver 427, and the end-to-end QoS module 408.

In block 504, the processor may determine a QoS provided by the second communication network within the communication path. In some embodiments, the processor may determine a packet error rate of the second communication network. In some alignments, the processor may determine an available throughput of the second communication network. In some embodiments, the processor may measure an end-to-end achieved QoS, identify a QoS provided by the first communication network, and determine the QoS provided by the second communication network within the communication path based on the end-to-end achieved QoS and the QoS provided by the first communication network. Means for performing the operations of block 504 may include the processor 210, 212, 214, 216, 218, 252, 260, 428 of a computing device functioning as a network element, the wireless transceiver 266, the transceiver 427, and the QoS determination module 410.

In block 506, the processor may configure the first communication network to provide sufficient QoS to support the end-to-end QoS requirement based on the QoS provided by the second communication network. In some embodiments, the processor may send one or more messages to one or more network elements of the first communication network to configure operations of the one or more network elements of the first communication network to perform QoS operations to provide sufficient QoS to support the end-to-end QoS requirement. Means for performing the operations of block 506 may include the processor 210, 212, 214, 216, 218, 252, 260, 428 of a computing device functioning as a network element, the wireless transceiver 266, the transceiver 427, and the QoS configuration module 414.

FIGS. 6A-6I are process flow diagrams illustrating operations 600a-600i that may be performed by a processor of a computing device configured to function as a network element as part of the method 500 for managing end-to-end QoS in a communication path spanning a first communication network and a second communication network according to various embodiments. FIGS. 6J and 6K are conceptual diagrams illustrating example packet loss measurements. FIG. 6L is a conceptual diagram illustrating an example available bandwidth measurement. With reference to FIGS. 1-6L, the operations 600a-600i may be performed by a processor (such as the processor 210, 212, 214, 216, 218, 252, 260, 428) of a network element (e.g., 402) of the core network 140 or the 5G networks 151a, 161a, 171a, and 181a, a base station device (such as the base station 110a-110d, 200, 350, or a wireless device (e.g., 110a-110d, 200, 320).

Referring to FIG. 6A, blocks 602 and 604 are examples of operations that may be performed as part of the blocks 502 and 504 in FIG. 5, respectively. In various embodiments, the processor may perform the operations of blocks 602 and 604 in any order, or substantially simultaneously (indicated by the dashed box).

In block 602, the processor may determine an end-to-end packet error rate for communicating packets from a packet source to a packet destination via the communication path. In some embodiments, the communication path may span two or more communication networks, such as a first communication network and a second communication network. In some implementations, the first communication network and the second communication network may be different types of networks and/or implement different communication protocols (e.g., a 5G network and a non-5G network). Means for performing the operations of block 602 may include the processor 210, 212, 214, 216, 218, 252, 260, 428 of a computing device functioning as a network element, the wireless transceiver 266, the transceiver 427, and the end-to-end QoS module 408.

In block 604, the processor may determine a packet error rate of the second communication network in block 602. Means for performing the operations of block 604 may include the processor 210, 212, 214, 216, 218, 252, 260, 428 of a computing device functioning as a network element, the wireless transceiver 266, the transceiver 427, and the network measurement module 410.

In block 606, the processor may determine a required packet error rate of the first communication network based on the determined packet error rate of the second communication network. Means for performing the operations of block 606 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Referring to FIG. 6B, blocks 610 and 612 are examples of operations that may be performed as part of the blocks 502 and 504 in FIG. 5, respectively. In various embodiments, the processor may perform the operations of blocks 610 and 612 in any order, or substantially simultaneously (indicated by the dashed box).

In block 610, the processor may determine an end-to-end throughput requirement for communicating packets from a packet source to a packet destination via the communication path. In some embodiments, the communication path may span two or more communication networks, such as a first communication network and a second communication network. In some implementations, the first communication network and the second communication network may be different types of networks and/or implement different communication protocols (e.g., a 5G network and a non-5G network). Means for performing the operations of block 610 may include the processor 210, 212, 214, 216, 218, 252, 260, 428 of a computing device functioning as a network element, the wireless transceiver 266, the transceiver 427, and the end-to-end QoS module 408.

In block 612, the processor may determine an available throughput of the second communication network in block 610. Means for performing the operations of block 612 may include the processor 210, 212, 214, 216, 218, 252, 260, 428 of a computing device functioning as a network element, the wireless transceiver 266, the transceiver 427, and the network measurement module 410.

In block 614, the processor may determine a throughput requirement of the first communication network based on the determined available throughput of the second communication network. Means for performing the operations of block 614 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Figure 6C:
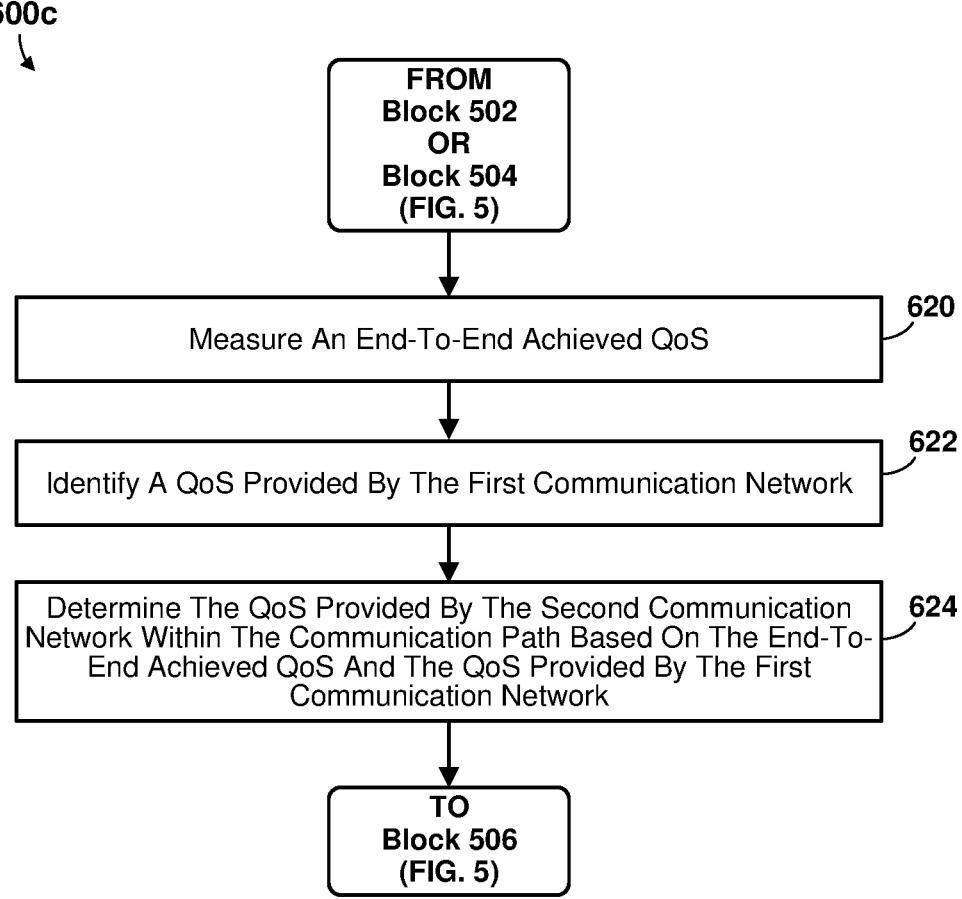

Referring to FIG. 6C, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may measure an end-to-end achieved QoS in block 620. In some embodiments, the processor may perform one or more measurements of packet delay, packet loss, packet departure and arrival time, packet dispersal, and/or another measurement to determine the QoS achieved (provided by) the end-to-end communication path (e.g., from one endpoint to another endpoint) that spans the first communication network and the second communication network. Means for performing the operations of block 620 may include the processor 210, 212, 214, 216, 218, 252, 260, 428 of a computing device functioning as a network element, the wireless transceiver 266, the transceiver 427, and the network measurement module 410.

In block 622, the processor may identify a QoS provided by the first communication network. In some embodiments, the processor may determine the QoS provided by the first communication network. In some embodiments, the processor may select a QoS to be provided by the first communication network. In some embodiments, the processor may identify, select, or set the QoS provided by the first communication network to be substantially constant or substantially invariant. Means for performing the operations of block 622 may include the processor 210, 212, 214, 216, 218, 252, 260, 428 of a computing device functioning as a network element, the wireless transceiver 266, the transceiver 427, and the QoS determination module 410.

In block 624, the processor may determine the QoS provided by the second communication network within the communication path based on the end-to-end achieved QoS and the QoS provided by the first communication network. In some embodiments, by configuring operations of one or more network elements of the first communication network to provide a substantially constant or substantially invariant QoS, the processor may determine the QoS provided by the second communication network within the communication path as a function of the end-to-end achieved QoS and the substantially constant or substantially invariant QoS provided by the first communication network. Means for performing the operations of block 624 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Referring to FIG. 6D, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a packet delay measurement 5G QoS Identifier (5QI) that corresponds to a constant packet delay in the first communication network in block 630. In some embodiments, a packet delay measurement 5QI may be configured and associated with operations that provide a substantially constant or substantially invariant packet delay to packets processed by and/or transported by the first communication network. In some embodiments, in response to the packet delay measurement 5QI, one or more network elements of the first communication network may be configured to provide substantially constant packet delay to packets processed by and/or transported by the network elements of the first communication network. In some embodiments, the one or more network elements of the first communication network may include a base station (which may include a Medium Access Control (MAC) scheduler, a routing function, etc.), one or more intermediate nodes, and a user plane function. Means for performing the operations of block 630 may include the processor 210, 212, 214, 216, 218, 252, 260, 428 of a computing device functioning as a network element, the wireless transceiver 266, the transceiver 427, and the QoS configuration module 414.

In block 632, the processor may measure an end-to-end achieved packet delay. Means for performing the operations of block 632 may include the processor 210, 212, 214, 216, 218, 252, 260, 428 of a computing device functioning as a network element, the wireless transceiver 266, the transceiver 427, and the network measurement module 412.

In block 634, the processor may determine the QoS provided by the second communication network within the communication path based on the end-to-end achieved packet delay and the constant packet delay in the first communication network. In some embodiments, measurement packets may be sent end-to-end along the communication path that spans multiple communication networks (e.g., the first communication network and the second communication network). In some embodiments, the processor may determine a packet delay of the second communication network based on an end-to-end packet delay and the substantially constant packet delay provided by the first communication network. In some embodiments, the packet delay provided by (incurred by, caused by, related to) the second communication network may be represented as $Dn=De2e-Dc$, in which Dn represents the packet delay of the second communication network (which may be a non-5G communication network), De2e represents the end-to-end packet delay, and Dc represents the substantially constant packet delay of the first communication network. Means for performing the operations of block 634 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6E:
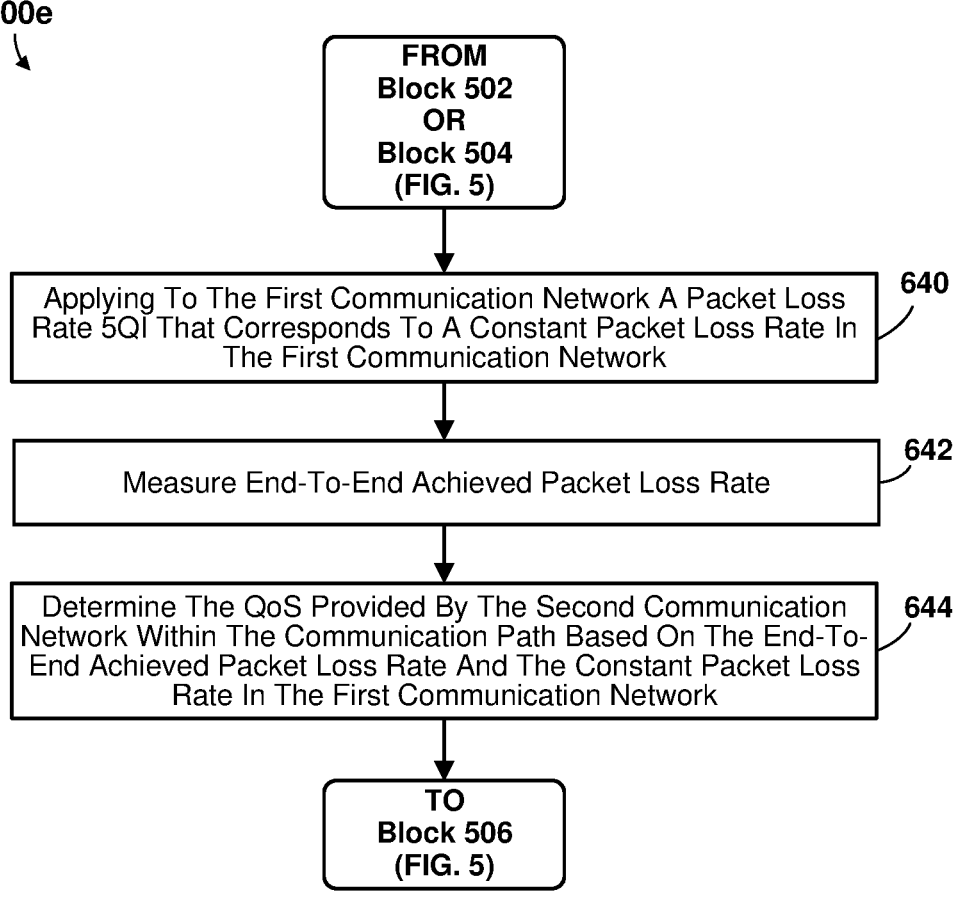
Figure 6J:
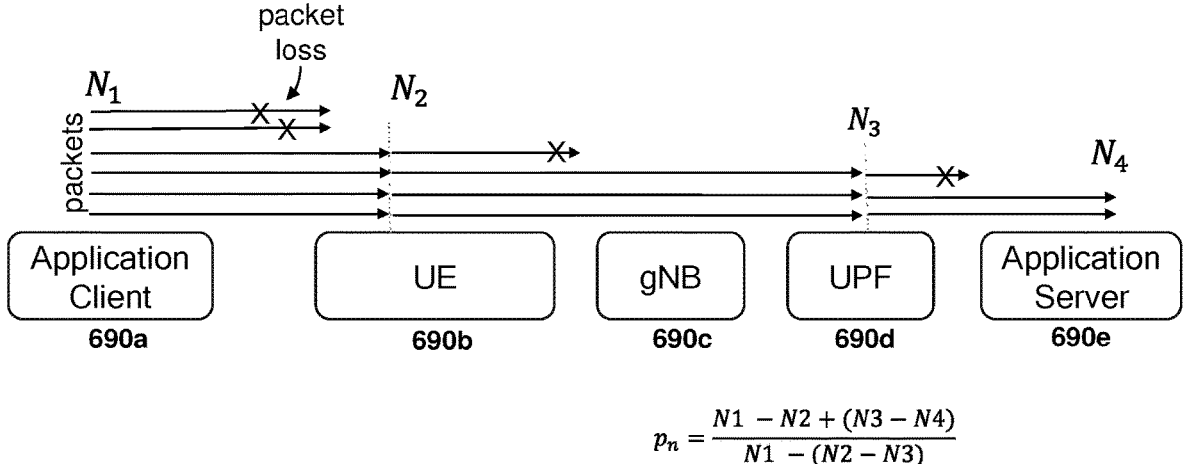
FIGS. 6J and 6K are conceptual diagrams illustrating example packet loss measurements.
Figure 6K:
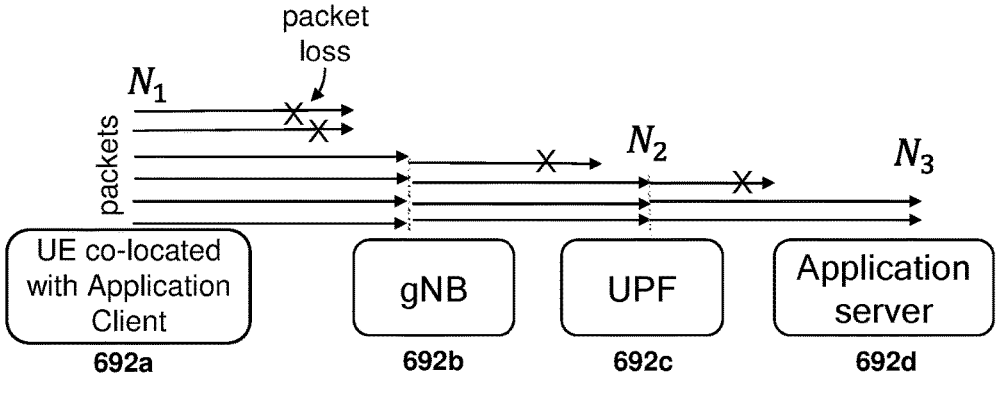
Figure 6L:
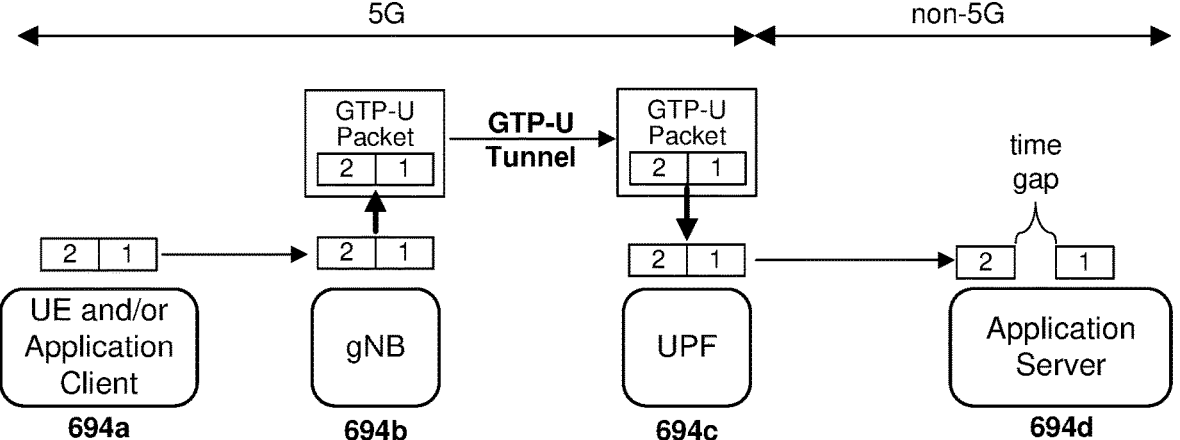
FIG. 6L is a conceptual diagram illustrating an example available bandwidth measurement.

Referring to FIG. 6E, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a packet loss rate 5QI that corresponds to a constant packet loss rate in the first communication network in block 640. In some embodiments, a packet loss rate 5QI may be configured and associated with operations that provide a substantially constant or substantially invariant packet loss rate to packets processed by and/or transported by the first communication network. In some embodiments, in response to the packet loss rate measurement 5QI, one or more network elements of the first communication network may be configured to provide the substantially constant packet loss rate to packets processed by and/or transported by the network elements of the first communication network. Means for performing the operations of block 640 may include the processor 210, 212, 214, 216, 218, 252, 260, 428 of a computing device functioning as a network element, the wireless transceiver 266, the transceiver 427, and the QoS configuration module 414.

In block 642, the processor may measure an end-to-end achieved packet loss rate. Means for performing the operations of block 642 may include the processor 210, 212, 214, 216, 218, 252, 260, 428 of a computing device functioning as a network element, the wireless transceiver 266, the transceiver 427, and the network measurement module 412.

In block 644, the processor may determine the packet loss rate provided by the second communication network within the communication path based on the end-to-end achieved packet loss rate and the constant packet loss rate in the first communication network. In some embodiments, measurement packets may be sent end-to-end along the communication path that spans multiple communication networks. In some embodiments, the processor may determine a packet loss rate of the second communication network based on an end-to-end packet loss rate and the substantially constant packet loss rate incurred by (caused by, related to, provided by) the first communication network. In some embodiments, the packet loss rate provided by the second communication network may be represented as:

$$p_n = \frac{p_{e2e} - p_c}{1 - p_c}$$

in which Pn represents the packet loss rate of the second communication network (which may be a non-5G communication network), Pe2e represents the end-to-end packet loss rate, and Pc represents the substantially constant packet loss rate provided by the first communication network. Means for performing the operations of block 644 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Referring to FIG. 6F, before measuring an end-to-end achieved QoS in block 620 as described, the processor may apply to the first communication network a packet loss rate 5QI associated with a packet loss measurement procedure that excludes packet losses in the first communication network. In some embodiments, a packet loss rate 5QI may be configured and associated with operations that provide a substantially constant or substantially invariant packet loss rate to packets processed by and/or transported by the first communication network. In some embodiments, in response to the packet loss rate measurement 5QI, one or more network elements of the first communication network may be configured to provide the substantially constant packet loss rate to packets processed by and/or transported by the network elements of the first communication network. Means for performing the operations of block 650 may include the processor 210, 212, 214, 216, 218, 252, 260, 428 of a computing device functioning as a network element, the wireless transceiver 266, the transceiver 427, and the QoS configuration module 414.

In block 652, the processor may measure an end-to-end achieved packet loss. Means for performing the operations of block 652 may include the processor 210, 212, 214, 216, 218, 252, 260, 428 of a computing device functioning as a network element, the wireless transceiver 266, the transceiver 427, and the network measurement module 412.

In block 654, the processor may determine the QoS provided by the second communication network within the communication path based on the end-to-end achieved packet loss and the packet loss measurement procedure. In some embodiments, measurement packets may be sent end-to-end along the communication path that spans multiple communication networks. In some embodiments, the processor may measure packet losses at multiple points along the communication path, and may perform one or more operations to exclude packet losses in the first communication network.

For example, referring to FIG. 6J, an application client 690a (e.g., executing on the wireless device) 174 may transmit during a first time period a number of packets N1 addressed to an application server 690e (e.g., 176, 188). An intermediate device, such as a UE 690b (e.g., the UE 172a, 182a) may receive during a second time period a number of packets N2. The second time period may include the same duration as the first time period and may have a first time offset (e.g., the second time period may be later than the first time period by the first time offset). The first time offset may be based on the delay (e.g., that a packet would experience) from the application client 690a to the intermediate device UE 690b. A network element of the 5G core network, such as a UPF 690d (e.g., the UPF 172d or another network element of the 5G core network 172c) may receive during a third time period a number of packets N3. In some embodiments, the number of packets N3 may reflect packet loss at one or more network elements, such as at a gNB 690c. The third time period may include the same duration as the first time period and the second time period and may have a second time offset (e.g., the third time period may be later than the second time period by the second time offset). The application server 690e may receive during a fourth time period a number of packets N4. The fourth time period may include the same duration as the first, second, and third time periods and may have a third time offset (e.g., the fourth time period may be later than the third time period by the third time offset). In this example, the packet loss incurred by (provided by, related to) the second communication network (or in this example, the second communication networks 171b and 171c) may be represented as:

$$p_n = \frac{N1 - N2 + (N3 - N4)}{N1 - (N2 - N3)}$$

in which Pn represents the packet loss rate of the second communication network(s). In this manner, the processor may determine the packet loss rate attributable to the second communication network(s) by a packet loss measurement procedure that excludes packet losses in the first communication network.

In various embodiments, the packet loss rate at greater or fewer points along the communication path (i.e., greater or fewer Ns may be measured) depending on a network's configuration. For example, a packet loss rate between two nearby or close network elements (e.g., a UE co-located with a base station) may not be measured.

As another example, referring to FIG. 6K, a UE 692a (e.g., the UE 152a, 162a, 172a, 182a) may be co-located with an application client. In some embodiments, the application client may be executing on the UE 692a (e.g., the UE 152a, 162a), and the UE 692a may be located proximate to a device executing the application client (e.g., the wireless device 174, 184). In this example, the UE 692a may transmit during a first time period a number of packets N1 addressed to an application server 692d (e.g., 158, 168). An intermediate device, such as a UPF 692c (e.g., the UPF 152d, 162d) may receive a number of packets N2 during a second time period. The second time period may be the same duration as the first time period and may have a first time offset (e.g., the second time period may be later than the first time period by the first time offset). The first time offset may be based on the delay (e.g., that a packet would experience) from the UE 692a to the intermediate device UPF 692c. In some embodiments, the number of packets N2 may reflect packet loss at one or more network elements, such as at a gNB 692b. The application server 692d may receive during a third time period a number of packets N3. The third time period may be the same duration as the first and second time periods and may have a third time offset (e.g., the third time period may be later than the second time period by the second time offset). In this example, the packet loss incurred by (provided by, related to) the second communication network (or in this example, the second communication networks 171*b* and 171*c*) may be represented as:

$$p_n = \frac{N2 - N3}{N2}$$

in which Pn represents the packet loss rate of the second communication network(s). In this manner, the processor may determine the packet loss rate attributable to the second communication network(s) by a packet loss measurement procedure that excludes packet losses in the first communication network. Means for performing the operations of block 652 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Referring to FIG. 6G, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network an available bandwidth 5QI associated with an available bandwidth measurement procedure that configures resources of the first communication network such that a packet loss of the first communication network is substantially negligible relative to a packet loss of the second communication network in block 660.

In some embodiments, an available bandwidth 5QI may be configured and associated with operations that provide a substantially negligible packet loss in the first network relative to packets processed by and/or transported by the second communication network. In some embodiments, in response to the available bandwidth measurement 5QI, one or more network elements of the first communication network may be configured to process and/or transport packets in a manner that provides the substantially negligible packet loss. For example, the processor may "overprovision" transport and/or processing resources of the first communication network such that network element(s) of the first communication network provide no bottleneck to the end-to-end communication path relative to the second communication network. In some embodiments, the network elements of the first communication network may be provisioned in this manner for a relatively short period of time, such as for a duration of one or more a measurement operations. Means for performing the operations of block 660 may include the processor 210, 212, 214, 216, 218, 252, 260, 428 of a computing device functioning as a network element, the wireless transceiver 266, the transceiver 427, and the QoS configuration module 414.

In block 662, the processor may measure an end-to-end achieved available bandwidth. Means for performing the operations of block 662 may include the processor 210, 212, 214, 216, 218, 252, 260, 428 of a computing device functioning as a network element, the wireless transceiver 266, the transceiver 427, and the network measurement module 412.

In block 664, the processor may determine the QoS provided by the second communication network within the communication path based on the end-to-end achieved available bandwidth and the available bandwidth measurement procedure. For example, while the network element(s) of the first communication network are configured to provide the substantially negligible packet loss in the first network, the processor may measure an end-to-end available bandwidth, data rate, and/or bit rate. In such embodiments, the processor may determine the bandwidth, data rate, and/or bit rate of the second network to be substantially the same as the measured bandwidth, data rate, and/or bit rate. In some embodiments, this approach may be particularly useful for determining an available bandwidth for User Datagram Protocol (UDP) traffic flows or Transport Control Protocol (TCP) traffic flows. Means for performing the operations of block 664 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Referring to FIG. 6H, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network an available bandwidth 5QI associated with an available bandwidth measurement procedure in which data packets are transported in the first communication network back-to-back in block 670.

In some embodiments, in response to the available bandwidth 5QI, one or more network elements of the first communication network may be configured to process and/or transport packets back-to-back in a manner that introduces substantially negligible packet dispersion between or among transported packets. For example, the available bandwidth 5QI may be associated with a packet dispersion technique such that network elements of the first communication network are configured to transport packets in a manner that does not introduce or increase a time gap between or among transported packets. In some embodiments, network elements of the first communication network may be configured to achieve a substantially negligible time gap between packets using General Packet Radio Service (GPRS) Tunneling Protocol in the user plane (GTP-U) to encapsulate packets (e.g., measurement packets) and transport them via a GTP-U packet in the GTP-U tunnel in the first communication network. In some embodiments, the transported packets may arrive back-to-back at a UPF (e.g., 152*d*, 162, 172*d*, 182*d*) for routing to the second communication network. Means for performing the operations of block 670 may include the processor 210, 212, 214, 216, 218, 252, 260, 428 of a computing device functioning as a network element, the wireless transceiver 266, the transceiver 427, and the QoS configuration module 414.

In block 672, the processor may measure an end-to-end achieved available bandwidth. Means for performing the operations of block 672 may include the processor 210, 212, 214, 216, 218, 252, 260, 428 of a computing device functioning as a network element, the wireless transceiver 266, the transceiver 427, and the network measurement module 412.

In block 674, the processor may determine the QoS provided by the second communication network within the communication path based on the end-to-end achieved available bandwidth and the available bandwidth measurement procedure. In some embodiments, while the network element(s) of the first communication network are configured to transport packets back-to-back in a manner that introduces substantially negligible packet dispersion between or among transported packets, the processor may measure a time gap between packets arriving at an endpoint device (e.g., 158, 168, 176, 188). In such embodiments, the processor may determine the time gap between packets arriving at the endpoint device (e.g., in the second communication network) to be indicative of the bandwidth provided by the second communication network.

For example, referring to FIG. 6L, a 5G network may include a UE 694*a*, a gNB 694*b*, and a UPF 694*c*. The UE 694*a* (which may include or be proximate to an application client) may send two packets [1] and [2] (e.g., measurement packets) to the gNB 694*b* (e.g., 152*b*, 162*b*, 172*b*, 182*b*). The gNB 694*b* may encapsulate the packets [1] and [2] in a GTP-U packet, and may send the GTP-U packet to the UPF 694*c* via a GTP-U tunnel (which may be identified by a Tunnel Endpoint Identifier (TEID). The packets [1] and [2] may arrive back-to-back at the UPF 694*c*, and the UPF 694*c* may send the packets [1] and [2] to an application server 694*d* in a non-5G network. A time gap between the packets [1] and [2] may be measured at the application server 694*d*. The time gap measured by this packet dispersion technique may reflect an available bandwidth of the non-5G network.

In such embodiments, the network element may determine the available bandwidth measured via the packet dispersion technique to be the available bandwidth the second communication network. In some embodiments, in a case where the communication path spans two or more second communication networks (e.g., as in the communication systems 170 and 180), the network element may perform measurements using, e.g., a packet dispersion technique, for each second communication network, and the network element may determine the minimum of the available bandwidths to be the available bandwidth of all of the second communications. Means for performing the operations of block 674 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Referring to FIG. 6I, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a network measurement 5QI associated with a network measurement procedure for performing end-to-end measurements of measurement packets transported along the communication path in block 680. In some embodiments, a network measurement 5QI may be configured and associated with operations that measure dedicated measurement packets (i.e., packets sent for measurement purposes that do not convey other signaling or data). In some embodiments, in response to the packet delay measurement 5QI, one or more network elements of the first communication network may be configured to transport the network measurement packets in a QoS flow exclusively for network measurement purposes. Means for performing the operations of block 680 may include the processor 210, 212, 214, 216, 218, 252, 260, 428 of a computing device functioning as a network element, the wireless transceiver 266, the transceiver 427, and the QoS configuration module 414.

In block 682, the processor may measure an end-to-end achieved QoS. Means for performing the operations of block 682 may include the processor 210, 212, 214, 216, 218, 252, 260, 428 of a computing device functioning as a network element, the wireless transceiver 266, the transceiver 427, and the network measurement module 412.

In block 684, the processor may determine the QoS provided by the second communication network within the communication path based on the end-to-end achieved QoS and the network measurement procedure. In some embodiments the network elements may function as a measurement entity to perform end-to-end measurements of the measurement packets, to determine the QoS provided by the second communication network. Means for performing the operations of block 684 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

In various embodiments, a measurement entity may be configured to measure packet delay or message delay incurred by or caused by one or more non-5G networks (a "non-5G delay"). In various embodiments, the measurement entity may be configured to coordinate measurement procedures executed on the various entities involved. In various embodiments, the measurement entity may be executed by a processor in a UE, the processor in a network element in the 5G network, a processor executing and application client, or a processor executing in an application server.

In some embodiments, the measurement entity may be configured to determine a message delay or packet delay based on measurement messages that include timestamps sent between two endpoint devices (e.g., a packet source and a packet destination) along a multi-network communication path. In some embodiments, the measurement messages may include a timestamp request in a time stamp reply. In some embodiments, the measurement messages may include Real Time Protocol (RTP) or Real Time Control Protocol (RTCP) messages. In some embodiments, the endpoint devices may include smart glasses and an application server that communicate via the communication path. In some embodiments, the endpoint devices may include two UEs communicating via the communication path.

In various embodiments, a message or messages transmitted by various computing devices and/or network elements may include timestamp information. In some embodiments, timestamp information may include an Internet Control Message Protocol (ICMP) timestamp.

Figure 7A:
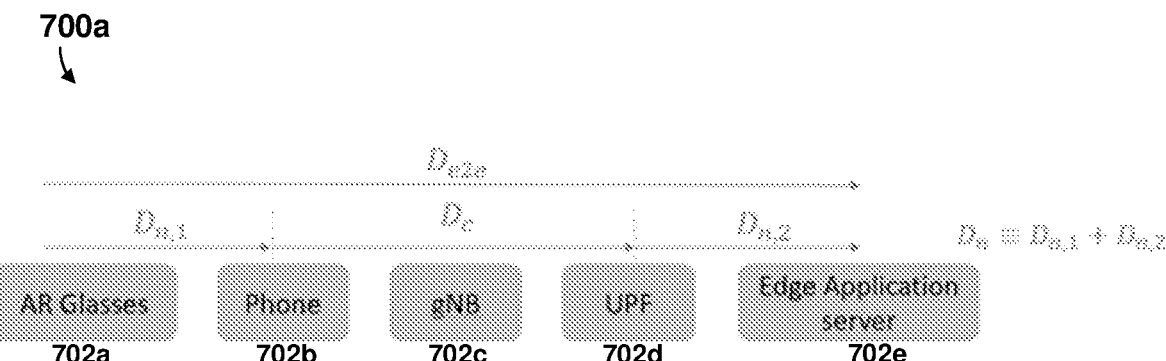
FIGS. 7A-7C illustrate aspects of method for reporting a delay for network segments in an end-to-end communication path according to various embodiments.

FIG. 7A illustrates aspects of a method 700a for reporting a delay for network segments in an end-to-end communication path according to various embodiments. With reference to FIGS. 1A-7A, the operations of the method 700a may be performed by a processor (such as the processor 210, 212, 214, 216, 218, 252, 260) of a computing device (e.g., 120a-120e, 152a, 158, 162a, 168, 172a, 174, 176, 182a, 184, 188, 320, 1000) such as a wireless device, or a network element (e.g., 350, 402, 900) of a core network (e.g., 140) or the cellular (e.g., 5G) networks 151a, 161a, 171a, and 181a, or a base station device (such as the base station 110a-110d, 200, 350). The method 700a may include operations for determining an end-to-end delay.

A key challenge for a 5G relay architecture involves properly estimating QoS allocation(s) that may be required to support services such as augmented reality (AR) sessions, mixed reality (MR) sessions, and the like that may be performed by UEs coupled to AR glasses 702a (e.g., 174, 184). The QoS allocation(s) may take into account a wireless communication link (e.g., a "tethering" link) from the AR glasses 702a to a phone device 702b or another device that also communicates with a 5G network (a "5G device"). Aspects of this wireless communication link affect many QoS parameters, including bitrate, packet loss, delay, and jitter.

The figures and procedures described below use uplink delay as an example, but they are applicable in various embodiments to downlink delay and/or round-trip delay. Referring to FIG. 7A, components of an end-to-end delay communication ("$D_{e2e}$") may include a tethering link delay ("$D_{n,1}$"), a delay over an intermediate communication network ("$D_c$"), and a delay caused by a communication link ("$D_{n,2}$") between the UPF 702d and Edge application server 702e. In some embodiments, $D_n \equiv D_{n,1} + D_{n,2}$. The end-to-end delay may refer to an uplink end-to-end delay, a downlink end-to-end delay, and/or a round-trip end-to-end delay.

The phone 702b may estimate the effect of the tethering link $D_{n,1}$ on overall QoS requirement(s) to enable devices to perform operations for smooth performance of an AR/MR session. Also, the phone 702b (via a Media Access Function) and/or a network element such as UPF 702d may determine a delay caused by the communication link $D_{n,2}$ between the UPF 702d and Edge application server 702e (e.g., an Internet communication link). In some embodiments, the phone 702b and/or the UPF 702d may estimate the delay $D_{n,2}$ by performing measurement tests for latency, packet loss, and bit rate, or by exchanging information with a radio access network (RAN) (e.g., gNB 702c) or AF managing a QoS policy. In some embodiments, an element of the 5G core network (e.g., the UPF 702d) may adjust its QoS allocation for the 5G network based on the observation of the status of the tethering link and the Internet, and may transmit one or more commands to one or more network elements to manage end-to-end QoS.

Figure 7B:
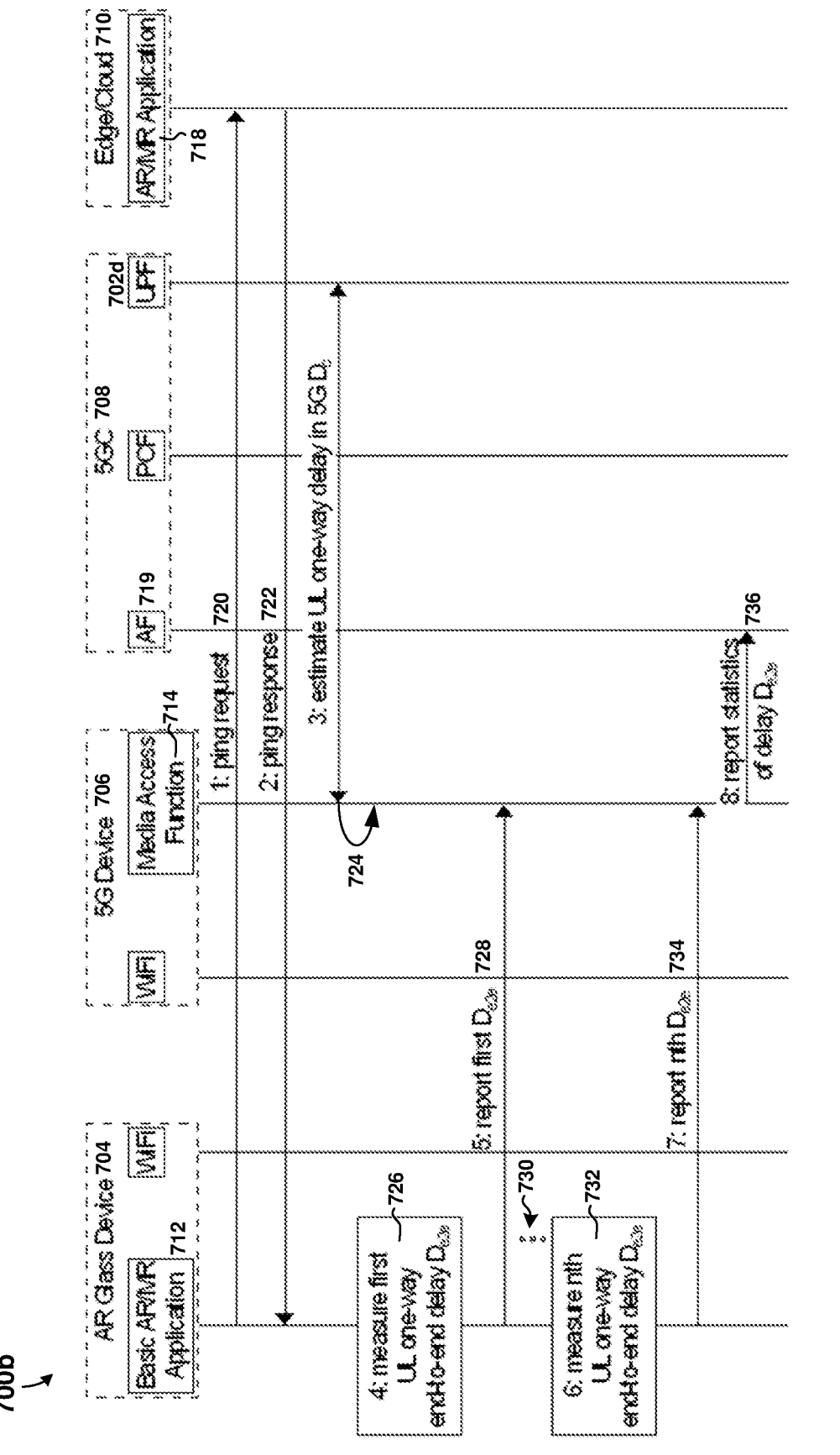

FIG. 7B illustrates aspects of a method 700b for reporting a delay for network segments in an end-to-end communication path according to various embodiments. With reference to FIGS. 1A-7B, the operations of the method 700b may be performed by a processor (such as the processor 210, 212, 214, 216, 218, 252, 260) of a computing device (e.g., 120a-120e, 152a, 158, 162a, 168, 172a, 174, 176, 182a, 184, 188, 320, 1000) such as a wireless device, or a network element (e.g., 350, 402, 900) of a core network (e.g., 140) or the cellular (e.g., 5G) networks 151a, 161a, 171a, and 181a, or a base station device (such as the base station 110a-110d, 200, 350). The method 700b represents operations that may be performed by various devices to measure latency in the end-to-end communication path that involves performing segment-by-segment delay measurement(s) and reporting delay for network segments in an end-to-end communication path.

In various embodiments, an end-to-end communication path may include a network segment across a cellular communication network (e.g., 5G Core Network (5GC) 708) (a first communication network). The end-to-end communication path also may include one or more non-cellular network segments (one or more second communication networks), such as a tethering link segment between two computing devices, for example, a Wi-Fi segment or cellular sidelink between AR glasses device 704 and a cellular-enabled computing device 706 (e.g., a 5G Device), and/or a communication link between an Edge server device or a cloud server device 710 and a network element of the 5GC 708.

An application executing in the AR glasses device 704 (e.g., "Basic AR/MR Application" 712) may send a ping request 720 to an application executing in the Edge/cloud server device 710 (e.g., "AR/MR Application" 718). The application 718 may respond with a ping response 722. The ping request 720 and the ping response 722 may be handled (routed, processed) by intermediate devices or functions, such as a Media Access Function 714 executing in the 5G device 706. Based on the ping request 720 and/or the ping response 722, the Media Access Function 714 of the 5G device 706 may perform operations 724 to estimate an uplink one-way delay in the 5G network 708 ("Uplink $D_c$"). Based on the ping request 720 and/or the ping response 722, the Media Access Function 714 of the 5G device 706 may perform operations 724 to estimate a downlink one-way delay in the 5G network 708 (i.e., "Downlink $D_c$" (not illustrated)). Based on the ping request 720 and/or the ping response 722, the Media Access Function 714 of the 5G device 706 may perform operations 724 to estimate a round-trip delay in the 5G network 708 (i.e., "Round-trip $D_c$" (not illustrated)).

Based on the ping request 720 and/or the ping response 722, the application 712 executing in the AR glasses device 704 may perform operations 726 to measure a first uplink one-way end-to-end delay ("$D_{e2e}$"). The application 712 may send a report 728 including the first uplink one-way end-to-end delay to the Media Access Function 714 of the 5G device 706. In various embodiments, the application 712 may perform operations 730 that include performing another measurement of the uplink one-way end-to-end delay and sending a message to the Media Access Function 714 of the 5G device 706 reporting the measured uplink one-way end-to-end delay. The application 712 may perform measurements of the uplink one-way end-to-end delay from time to time and may report such measurements to the Media Access Function 714 of the 5G device 706, up to measuring an Nth uplink one-way end-to-end delay 732 and sending a message 734 reporting the measured Nth uplink one-way end-to-end delay to the Media Access Function 714. In this manner, the measurement(s) of the uplink one-way end-to-end delay may reflect any changes in the end-to-end delay, and may dynamically report/update such measurements. Similarly, the measurement(s) of the downlink one-way end-to-end delay may be obtained, and the report may be sent. Similarly, the measurement(s) of the round-trip end-to-end delay may be obtained and a report may be sent. In various embodiments, the report including the measured end-to-end delay (or the dynamically updating end-to-end delay) may be configured to enable the core network 708 (e.g., the first communication network) to dynamically update core network device provisioning (e.g., one or more configurations of a core network device) for providing a specified or determined end-to-end QoS.

The Media Access Function 714 may send a report 736 to a network element of the core network 708, such as Application Function (AF) 719, that includes information about the measured end-to-end delay. In some embodiments, the report 736 may include one or more measured end-to-end delays. In some embodiments, the report may include one or more delay statistics based on the determined end-to-end delay measurement (e.g., uplink end-to-end delay measurement). In various embodiments, the delay statistics may represent or be based on measurements of delay over one or more non-cellular networks (i.e., the second communication network). In some embodiments, the delay statistics may include a mean of one or more delay measurements, a standard deviation of one or more delay measurements, a distribution of one or more delay measurements (such as a quantized cumulative distribution function (CDF)), bins (e.g., resulted from partitioning a range of measurements) with probabilities of one or more delay measurements) with probabilities of one or more delay measurements, and/or percentile (e.g., 95th percentile) of one or more delay measurements.

Figure 7C:
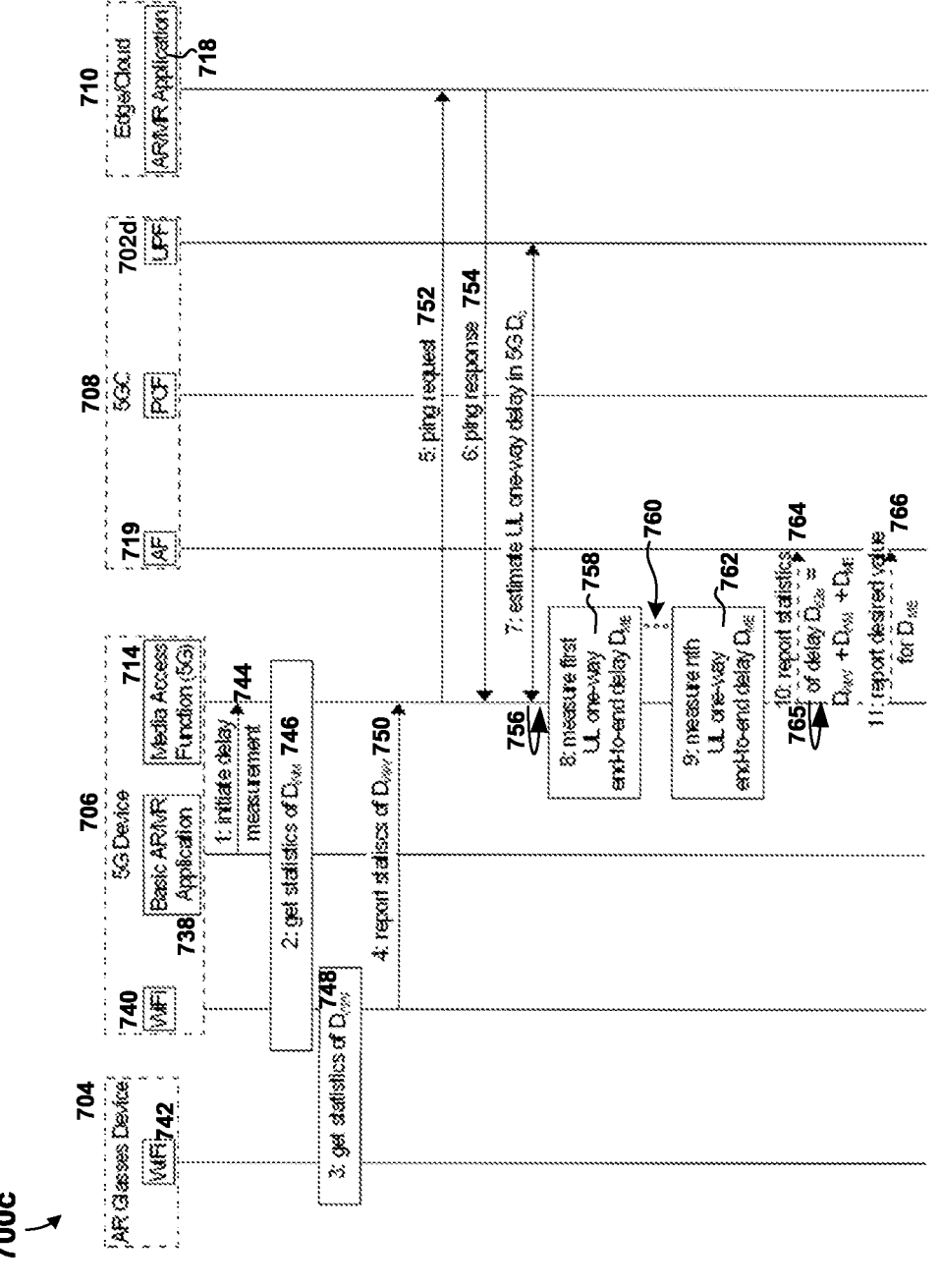

FIG. 7C illustrates aspects of a method 700c for reporting a delay for network segments in an end-to-end communication path according to various embodiments. With reference to FIGS. 1A-7C, the operations of the method 700c may be performed by a processor (such as the processor 210, 212, 214, 216, 218, 252, 260) of a computing device (e.g., 120a-120e, 152a, 158, 162a, 168, 172a, 174, 176, 182a, 184, 188, 320, 1000) such as a wireless device, or a network (e.g., 350, 402, 900) element of the core network 140 or the cellular (e.g., 5G) networks 151a, 161a, 171a, and 181a, or a base station device (such as the base station 110a-110d, 200, 350). The method 700c represents operations that may be performed by various devices to measure latency in the end-to-end communication path that involves performing segment-by-segment delay measurement(s) and reporting delay for network segments in an end-to-end communication path.

In some embodiments, an application executing in the 5G device 706 (e.g., "Basic AR/MR Application" 738) may send a message 744 to the Media Access Function 714 of the 5G device 706 to initiate operations to perform delay measurement(s). The Media Access Function 714 may perform operations 746 to obtain information related to a delay incurred between a Wi-Fi component or module 740 of the 5G device 706 and the Media Access Function 714 ("$D_{WM}$"). In various embodiments, the Wi-Fi component 740 may control operations of various circuitry, hardware, software, etc. for Wi-Fi communications over the 5G device 706. In some embodiments, the information related to the delay between the Wi-Fi component 740 and the Media Access Function 714 may include statistics related to the incurred delay.

The Wi-Fi component 740 also may perform operations 748 to obtain (determine, calculate, measure) information related to a delay incurred between a Wi-Fi component 742 of the AR glasses device 704 and the Wi-Fi component 740 of the 5G device 706 ("$D_{WW}$"). The Wi-Fi component 740 may send a message 750 to the Media Access Function 714 including the obtained information. In some embodiments, the obtained information may include statistics related to the incurred delay between the Wi-Fi component 742 on the Wi-Fi component 740.

The Media Access Function 714 may send a measurement packet to and receive a measurement packet from the application 718 executing in the Edge/cloud server device 710. In some implementations, the Media Access Function 714 may send a ping request 752 to the application 718 executing in the Edge/cloud server device 710. The application 718 may respond with a ping response 754. Based on the ping request 752 and/or the ping response 754, the Media Access Function 714 of the 5G device 706 may perform operations 756 to estimate a one-way delay (e.g., an uplink one-way delay "Uplink $D_c$") in the 5G network 708. In some implementations, the Media Access Function 714 may send a ICMP timestamp message (e.g., based on Internet Engineering Task Force (IETF) RFC792) to the application 718 executing in the Edge/cloud server device 710. The application 718 may respond with a timestamp reply message. Based on timestamps in the timestamp reply message (e.g., containing an originate timestamp, receive timestamp, transmit timestamp as in IETF RFC792) and the time when the timestamp reply message is received, the Media Access Function 714 of the 5G device 706 may perform operations 756 to estimate a one-way delay (e.g., an uplink one-way delay "Uplink $D_c$") in the 5G network 708.

The Media Access Function 714 also may perform operations 758 to measure a first uplink one-way end-to-end delay between the Media Access Function 714 and the AR/MR application 718 executing in the Edge/cloud device 710 ("$D_{ME}$"). The Media Access Function 714 may perform operations 762 using the measurements 760 of the first uplink one-way end-to-end delay between the Media Access Function 714 and the AR/MR application 718 to remeasure the $D_{ME}$ from time to time, up to performing operations 762 to measure an Nth $D_{ME}$.

In optional operations 764, the Media Access Function 714 may send a report to a network element of the core network 708, such as Application Function (AF) 719, that includes one or more delay statistics based on a determined end-to-end delay (e.g., uplink end-to-end time delay). In some embodiments, the Media Access Function 714 may perform operations 765 to determine the uplink one-way end-to-end delay ("$D_{e2e}$"). In some embodiments, the one-way end-to-end delay may be represented as $De2e=D_{WW}+D_{WM}+D_{ME}$. The report including the determined end-to-end delay may be configured to enable the core network 708 (e.g., the first communication network) to dynamically update core network device provisioning (e.g., one or more configurations of a core network device) for providing a specified or determined end-to-end QoS.

In optional operations 766, the Media Access Function 714 may send a report to a network element of the core network 708 (e.g., AF 719) that includes a requested value or a desired value of the uplink one-way end-to-end delay between the Media Access Function 714 and the AR/MR application 718 executing in the Edge/cloud device 710 ($D_{ME}$). In various embodiments, the requested value or desired value of $D_{ME}$ may include a requested delay budget for the first communication network. The report including the $D_{ME}$ may be configured to enable the core network 708 (e.g., the first communication network) to dynamically update core network device provisioning (e.g., one or more configurations of a core network device) for providing a specified or determined end-to-end QoS.

FIG. 8 is a process flow diagram illustrating a method 800 that may be performed by a processor of a computing device for reporting a delay for network segments in an end-to-end communication path according to various embodiments. With reference to FIGS. 1A-8, the operations of the method

800 may be performed by a processor (such as the processor 210, 212, 214, 216, 218, 252, 260) of a computing device (e.g., 120a-120e, 152a, 158, 162a, 168, 172a, 174, 176, 182a, 184, 188, 320, 1000) such as a wireless device.

In block 802, the processor may determine an uplink end-to-end delay measurement of a communication path spanning a first communication network and a second communication network. In various embodiments, the first communication network may be a cellular network (e.g., a 5G network) and the second communication network may not be a cellular network (i.e., the second communication network may be a non-cellular network).

In block 804, the processor may transmit a message including delay information based on the determined uplink end-to-end delay measurement to a network element of the first communication network, in which the message is configured to enable the network element of the first communication network to configure the first communication network to provide sufficient Quality of Service (QoS) to support an end-to-end QoS requirement based on the delay information.

In some embodiments, the delay information may include a requested delay budget for the first communication network. In some embodiments, the delay information may include a requested delay budget for a network segment between a first computing device and a second computing device that are at the same end of the communication path. In some embodiments, the delay information may include a requested delay budget for a network segment between a first endpoint computing device at a first end of the communication path and a second endpoint computing device at a second end of the communication path that is opposite from the first end of the communication path. In some embodiments, the delay information may include one or more delay statistics based on the determined uplink end-to-end delay measurement.

Following the performance of the operations of block 804, a processor of a computing device functioning as a network may perform the operations of blocks 502 and 504, as described.

Figure 9:
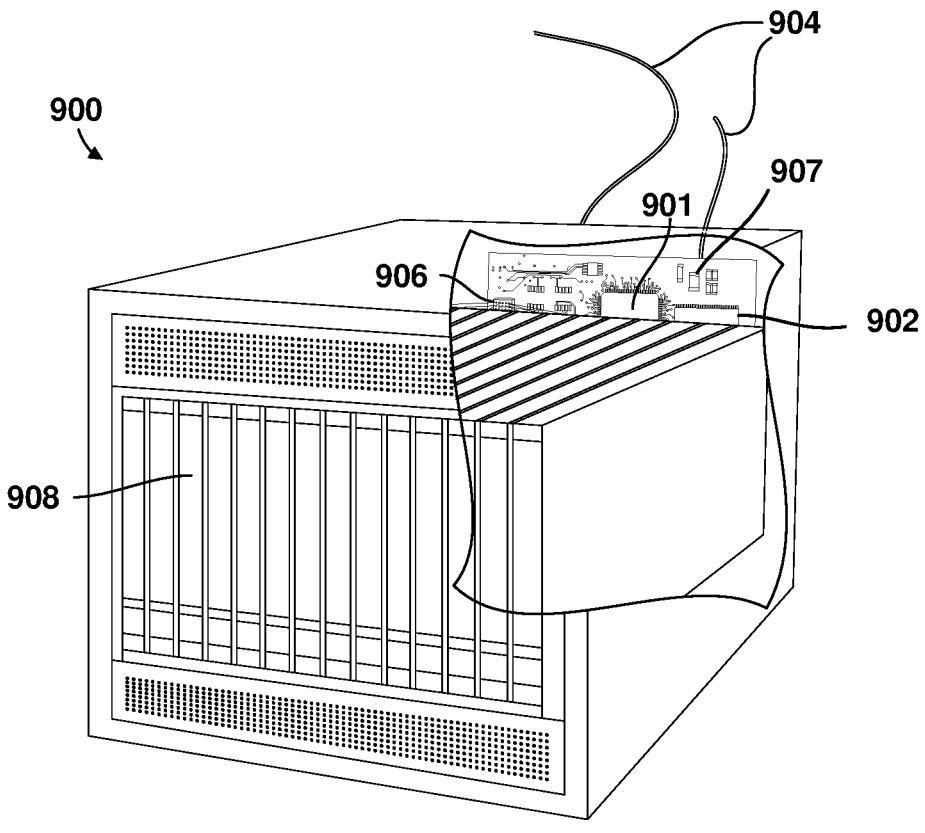
FIG. 9 is a component block diagram of a network element device suitable for use with various embodiments.

FIG. 9 is a component block diagram of a network element device suitable for use with various embodiments. Such network element devices (e.g., a network element (e.g., 402) of the core network 140 or the 5G networks 151a, 161a, 171a, and 181a, a base station device (such as the base station 110a-110d, 200, 350), and/or the like) may include at least the components illustrated in FIG. 9. With reference to FIGS. 1-9, the network element device 900 may include a processor 901 coupled to volatile memory 902 and a large capacity nonvolatile memory, such as a disk drive 908. The network element device 900 also may include a peripheral memory access device 906 such as a floppy disc drive, compact disc (CD) or digital video disc (DVD) drive coupled to the processor 901. The network element device 900 also may include network access ports 904 (or interfaces) coupled to the processor 901 for establishing data connections with a network, such as the Internet or a local area network coupled to other system computers and servers. The network element device 900 may include one or more antennas 907 for sending and receiving electromagnetic radiation that may be connected to a wireless communication link. The network element device 900 may include additional access ports, such as USB, Firewire, Thunderbolt, and the like for coupling to peripherals, external memory, or other devices.

Figure 10:
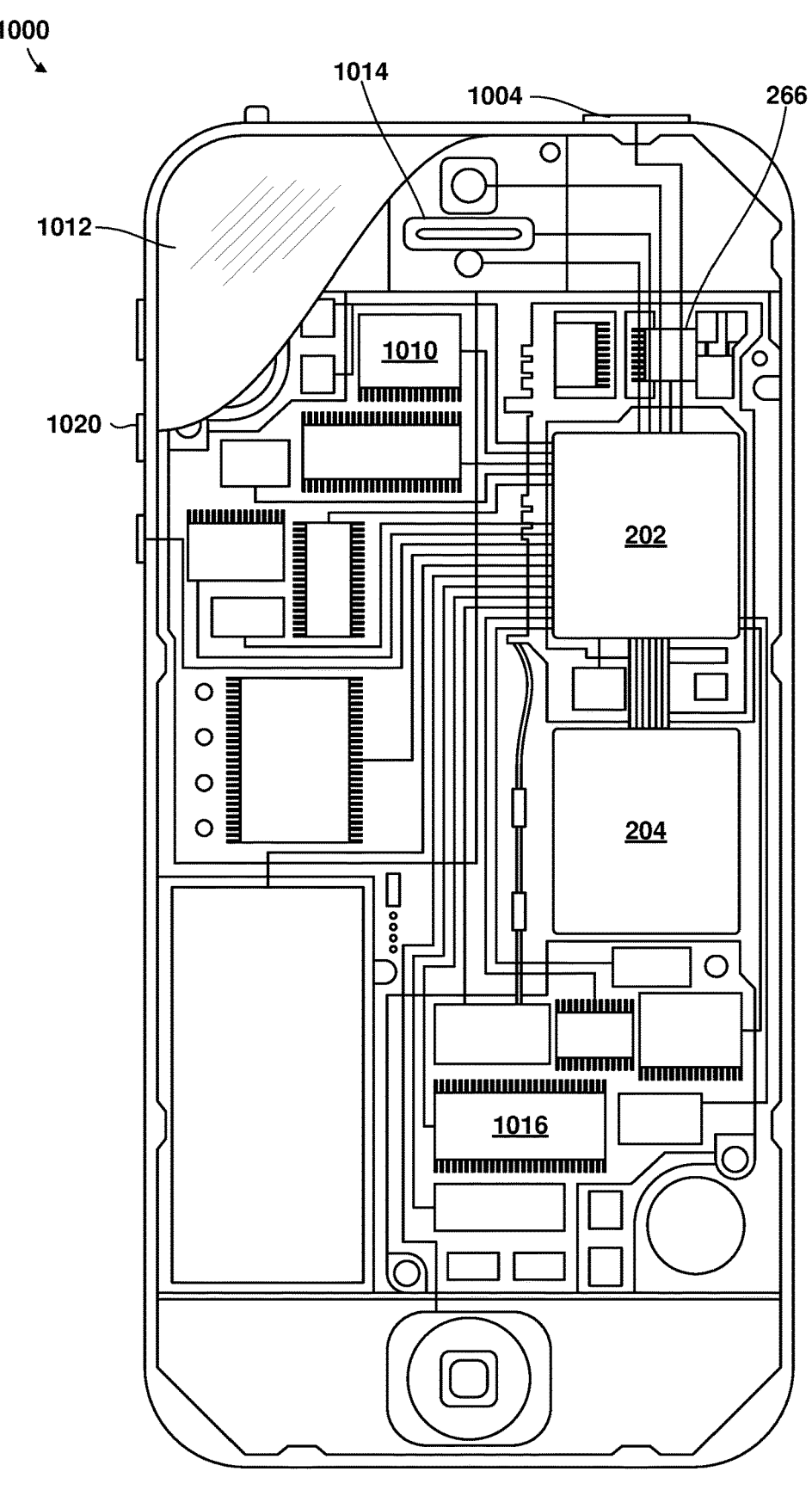
FIG. 10 is a component block diagram of a wireless device suitable for use with various embodiments.

FIG. 10 is a component block diagram of a wireless device 1000 suitable for use with various embodiments. In some embodiments, the wireless device 1000 may operate as a network element. With reference to FIGS. 1-10, various embodiments may be implemented on a variety of wireless devices 1000 (for example, the wireless device 120a-120e, 200, 320, 404), an example of which is illustrated in FIG. 10 in the form of a smartphone. The wireless device 1000 may include a first SOC 202 (for example, a SOC-CPU) coupled to a second SOC 204 (for example, a 5G capable SOC). The first and second SOCs 202, 204 may be coupled to internal memory 1016, a display 1012, and to a speaker 1014. Additionally, the wireless device 1000 may include an antenna 1004 for sending and receiving electromagnetic radiation that may be connected to a transceiver 427 coupled to one or more processors in the first and/or second SOCs 202, 204. Wireless device 1000 may include menu selection buttons or rocker switches 1020 for receiving user inputs.

The wireless device 1000 may include a sound encoding/decoding (CODEC) circuit 1010, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 1010 may include a digital signal processor (DSP) circuit (not shown separately).

The processors of the network element device 900 and the wireless device 1000 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 902, 1016 before they are accessed and loaded into the processor. The processors may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500, 600a-600i, 700a-700c, and 800 may be substituted for or combined with one or more operations of the methods and operations 500, 600a-600i, 700a-700c, and 800.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method performed by a computing device, including determining an end-to-end delay measurement of a communication path spanning a first communication network and a second communication network, and transmitting a message including delay information based on the determined end-to-end delay measurement to a network element of the first communication network, in which the message is configured to enable the network element of the first communication network to configure the first communication network to provide sufficient Quality of Service (QoS) to support an end-to-end QoS requirement based on the delay information.

Example 2. The method of example 1, in which the first communication network is a cellular network and the second communication network is not cellular network.

Example 3. The method of either of example 1 or example 2, in which the delay information includes a requested delay budget for the first communication network.

Example 4. The method of either of example 1 or example 2, in which the delay information includes a requested delay budget for a network segment between a first computing device that is not at an end of the communication path and a second computing device that is at an end of the communication path.

Example 5. The method of either of example 1 or example 2, in which the delay information includes a requested delay budget for a network segment between a first endpoint computing device at a first end of the communication path and a second endpoint computing device at a second end of the communication path that is opposite from the first end of the communication path.

Example 6. The method of either of example 1 or example 2, in which the delay information includes one or more delay statistics based on the determined end-to-end delay measurement.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., Third Generation Partnership Project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:
one or more processors and one or more memories coupled with the one or more processors, the one or more processors configured to cause the computing device to:
receive, from a first computing device, an end-to-end delay report based on an end-to-end delay measurement between the first computing device and a second computing device; and
transmit a message comprising delay information based on the end-to-end delay report to a network element of a first communication network, wherein:
the end-to-end delay measurement is for a communication path spanning the first communication network and one or more second communication networks,
the first communication network is a cellular network and the one or more second communication networks are non-cellular networks, the first computing device is reachable via the communication path via a tethering link segment of a first one of the one or more second communication networks,
the second computing device is reachable via the communication path via a second one of the one or more second communication networks, and
the message is configured to enable the network element of the first communication network to configure the first communication network to provide sufficient Quality of Service (QoS) to support an end-to-end QoS requirement based on the delay information.

2. The computing device of claim 1, wherein the one or more processors are configured to cause the computing device to perform operations such that the delay information comprises a requested delay budget for the first communication network.

3. The computing device of claim 1, wherein the delay information comprises a requested delay budget for a network segment between the first computing device and another computing device that is not at an end of the communication path.

4. The computing device of claim 1, wherein the delay information comprises a requested delay budget for a network segment between the first computing device and the second computing device, and wherein the first computing device is a first endpoint computing device at a first end of the communication path and the second computing device is a second endpoint computing device at a second end of the communication path that is opposite from the first end of the communication path.

5. The computing device of claim 1, wherein the delay information comprises one or more delay statistics based on the end-to-end delay measurement.

6. A method performed by a computing device, comprising:
receiving, from a first computing device, an end-to-end delay report based on an end-to-end delay measurement between the first computing device and a second computing device; and
transmitting a message comprising delay information based on the end-to-end delay report to a network element of a first communication network, wherein:
the end-to-end delay measurement is for a communication path spanning the first communication network and one or more second communication networks,
the first communication network is a cellular network and the one or more second communication networks are non-cellular networks,
the first computing device is reachable via the communication path via a tethering link segment of a first one of the one or more second communication networks,
the second computing device is reachable via the communication path via a second one of the one or more second communication networks, and
the message is configured to enable the network element of the first communication network to configure the first communication network to provide sufficient Quality of Service (QoS) to support an end-to-end QoS requirement based on the delay information.

7. The method of claim 6, wherein the delay information comprises a requested delay budget for the first communication network.

8. The method of claim 6, wherein the delay information comprises a requested delay budget for a network segment between the first computing device and another computing device that is not at an end of the communication path.

9. The method of claim 6, wherein the delay information comprises a requested delay budget for a network segment between the first computing device and the second computing device.

10. The method of claim 6, wherein the delay information comprises one or more delay statistics based on the end-to-end delay measurement.

11. A computing device, comprising:

means for receiving, from a first computing device, an end-to-end delay report based on an end-to-end delay measurement between the first computing device and a second computing device; and means for transmitting a message comprising delay information based on the end-to-end delay report to a network element of a first communication network, wherein:

the end-to-end delay measurement is for a communication path spanning the first communication network and one or more second communication networks, the first communication network is a cellular network and the one or more second communication networks are non-cellular networks, the first computing device is reachable via the communication path via a tethering link segment of a first one of the one or more second communication networks, the second computing device is reachable via the communication path via a second one of the one or more second communication networks, and the message is configured to enable the network element of the first communication network to configure the first communication network to provide sufficient Quality of Service (QoS) to support an end-to-end QoS requirement based on the delay information.

12. The computing device of claim 11, wherein the delay information comprises a requested delay budget for the first communication network.

13. The computing device of claim 11, wherein the delay information comprises a requested delay budget for a network segment between the first computing device and another computing device that is not at an end of the communication path.

14. The computing device of claim 11, wherein the delay information comprises a requested delay budget for a network segment between the first computing device and the second computing device, and wherein the first computing device is a first endpoint computing device at a first end of the communication path and the second computing device is a second endpoint computing device at a second end of the communication path that is opposite from the first end of the communication path.

15. The computing device of claim 11, wherein the delay information comprises one or more delay statistics based on the end-to-end delay measurement.

16. One or more non-transitory processor-readable media having stored thereon processor-executable instructions that, when executed by one or more processors of a computing device, cause the computing device to perform operations comprising:

receiving, from a first computing device, an end-to-end delay report based on an end-to-end delay measurement between the first computing device and a second computing device; and transmitting a message comprising delay information based on the end-to-end delay report to a network element of a first communication network, wherein:

the end-to-end delay measurement is for a communication path spanning the first communication network and one or more second communication networks, the first communication network is a cellular network and the one or more second communication networks are non-cellular networks, the first computing device is reachable via the communication path via a tethering link segment of a first one of the one or more second communication networks, the second computing device is reachable via the communication path via a second one of the one or more second communication networks, and the message is configured to enable the network element of the first communication network to configure the first communication network to provide sufficient Quality of Service (QoS) to support an end-to-end QoS requirement based on the delay information.

17. The one or more non-transitory processor-readable media of claim 16, wherein the stored processor-executable instructions, when executed by the one or more processors, cause the computing device to perform operations such that the delay information comprises a requested delay budget for the first communication network.

18. The one or more non-transitory processor-readable media of claim 16, wherein the stored processor-executable instructions, when executed by the one or more processors, cause the computing device to perform operations such that the delay information comprises a requested delay budget for a network segment between the first computing device and another computing device that is not at an end of the communication path.

19. The one or more non-transitory processor-readable media of claim 16, wherein the stored processor-executable instructions, when executed by the one or more processors, cause the computing device to perform operations such that the delay information comprises a requested delay budget for a network segment between the first computing device and the second computing device, and wherein the first computing device is a first endpoint computing device at a first end of the communication path and the second computing device is a second endpoint computing device at a second end of the communication path that is opposite from the first end of the communication path.

20. The one or more non-transitory processor-readable media of claim 16, wherein the stored processor-executable instructions, when executed by the one or more processors, cause in the computing device to perform operations such that the delay information comprises one or more delay statistics based on the end-to-end delay measurement.

* * * * *